(12) United States Patent
Hejazi et al.

(10) Patent No.: US 10,433,261 B2
(45) Date of Patent: *Oct. 1, 2019

(54) SELF-OPTIMIZING DISTRIBUTED ANTENNA SYSTEM USING SOFT FREQUENCY REUSE

(71) Applicant: Dali Systems Co. Ltd., George Town, Grand Cayman (KY)

(72) Inventors: Seyed Amin Hejazi, Burnaby (CA); Shawn Patrick Stapleton, Vancouver (CA)

(73) Assignee: Dali Systems Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,631

(22) Filed: Aug. 14, 2017

(65) Prior Publication Data

US 2018/0092045 A1 Mar. 29, 2018

Related U.S. Application Data

(63) Continuation of application No. 15/154,073, filed on May 13, 2016, now Pat. No. 9,769,766, which is a (Continued)

(51) Int. Cl.
*H04W 52/24* (2009.01)
*H04L 5/00* (2006.01)
(Continued)

(52) U.S. Cl.
CPC ......... *H04W 52/243* (2013.01); *H04L 5/0023* (2013.01); *H04L 5/0032* (2013.01);
(Continued)

(58) Field of Classification Search
CPC ... H04L 5/0023; H04L 5/0032; H04L 5/0073; H04W 52/243; H04W 52/346
See application file for complete search history.

(56) References Cited

U.S. PATENT DOCUMENTS 8,868,093 B1 10/2014 Shah et al.
9,363,768 B2 * 6/2016 Hejazi ................. H04W 52/243
(Continued)

OTHER PUBLICATIONS

U.S. Appl. No. 13/935,157 , "Non-Final Office Action", dated Aug. 13, 2015, 6 pages.
(Continued)

*Primary Examiner* — Mohamed A Kamara

(57) ABSTRACT

A method of determining a carrier power in a communications system including a processor includes a) setting a power differential between a reference carrier and one or more carriers, b) measuring a number of satisfied users at the power differential, and c) measuring a capacity for the satisfied users at the power differential. The method also includes d) increasing the power differential by a predetermined amount and e) determining, using the processor, that the number of satisfied users at the increased power differential is greater than or equal to the number of satisfied users at the power differential. The method further includes f) repeating a)-c) and g) setting the carrier power at an iterated power level.

20 Claims, 15 Drawing Sheets

(a) DAS - Soft Frequency Reuses (b) DAS - Hard Frequency Reuses (c) DAS - Full Frequency Reuses

Related U.S. Application Data continuation of application No. 13/935,157, filed on Jul. 3, 2013, now Pat. No. 9,363,768.

(60) Provisional application No. 61/669,572, filed on Jul. 9, 2012.

(51) Int. Cl.
*H04W 52/34* (2009.01)
*H04W 72/04* (2009.01)

(52) U.S. Cl.
CPC ......... *H04L 5/0073* (2013.01); *H04W 52/346* (2013.01); *H04W 72/0473* (2013.01)

(56) References Cited

U.S. PATENT DOCUMENTS

| | | | |
|---|---|---|---|
| 9,769,766 B2* | 9/2017 | Hejazi | H04W 52/243 |
| 2009/0252139 A1* | 10/2009 | Ludovico | H04W 16/32 |
| | | | 370/342 |
| 2010/0190519 A1 | 7/2010 | Zavadsky et al. | |
| 2010/0296471 A1 | 11/2010 | Heo et al. | |
| 2010/0322090 A1 | 12/2010 | Zhang et al. | |
| 2011/0158118 A1 | 6/2011 | Chou et al. | |
| 2012/0039254 A1* | 2/2012 | Stapleton | H03F 1/3247 |
| | | | 370/328 |
| 2013/0128832 A1* | 5/2013 | Kang | H04W 72/042 |
| | | | 370/329 |
| 2013/0272202 A1 | 10/2013 | Stapleton et al. | |
| 2014/0141801 A1 | 5/2014 | Kummetz et al. | |
| 2014/0161057 A1 | 6/2014 | Hejazi et al. | |
| 2017/0013568 A1 | 1/2017 | Hejazi et al. | |

OTHER PUBLICATIONS

U.S. Appl. No. 13/935,157, "Notice of Allowance", dated Feb. 8, 2016, 9 pages.

U.S. Appl. No. 15/154,073, "Non-Final Office Action", dated Oct. 31, 2016, 9 pages.

U.S. Appl. No. 15/154,073, "Notice of Allowance", dated May 26, 2017, 5 pages.

* cited by examiner (a) DAS - Soft Frequency Reuses (b) DAS - Hard Frequency Reuses (c) DAS - Full Frequency Reuses

SELF-OPTIMIZING DISTRIBUTED ANTENNA SYSTEM USING SOFT FREQUENCY REUSE

CROSS-REFERENCES TO RELATED APPLICATIONS

This application is a continuation of U.S. patent application Ser. No. 15/154,073, filed on May 13, 2016, now U.S. Pat. No. 9,769,766, which is a continuation of U.S. patent application Ser. No. 13/935,157, filed on Jul. 3, 2013, now U.S. Pat. No. 9,363,768, which claims priority to U.S. Provisional Patent Application No. 61/669,572, filed on Jul. 9, 2012; the disclosures of which are hereby incorporated by reference in their entirety.

SUMMARY OF THE INVENTION

According to an embodiment of the present invention, a method of determining a carrier power in a communications system including a processor is provided. The method includes a) setting a power differential between a reference carrier and one or more carriers, b) measuring a number of satisfied users at the power differential, and c) measuring a capacity for the satisfied users at the power differential, which may be referred to as an initial power differential. The method also includes d) adjusting the power differential by a predetermined amount and e) determining, using the processor, that the number of satisfied users at the adjusted power differential is greater than or equal to the number of satisfied users at the initial power differential. The method further includes f) repeating a)-e) and g) setting the carrier power at an iterated power level.

As described herein, unbalanced traffic distributions inside cellular networks are common occurrences. Embodiments of the present invention provide a throughput-balancing system that optimizes cellular performance according to the geographic traffic distribution in order to provide a high quality of service (QoS). The throughput of an Orthogonal Frequency Division Multiple Access (OFDMA) based architecture (DAS-SFR) that utilizes a combination Soft Frequency Reuse (SFR) technique and a Distributed Antenna System (DAS) is analyzed in light of embodiments of the present invention. A concept employed by this architecture is to distribute the antennas in a hexagonal cell in such a way that the central antenna is responsible for serving a special area, using all of the frequency bands, while the remaining antennas utilize only a subset of the frequency bands based on a frequency reuse factor. A DAS-SFR has the ability to distribute the cellular capacity (throughput) over a given geographic area. To enable throughput balancing among Distributed Antennas (DAs), embodiments of the present invention dynamically change the DA's carrier power to manage the inter-cell interference, as a function of the time-varying traffic. A Downlink Power Self-Optimization (PSO) algorithm, for three different resource allocation scenarios, is described for the DAS-SFR system. The transmit powers are optimized in order to maximize the spectral efficiency of a DAS-SFR and maximize the number of satisfied users under different user distributions in some embodiments. The PSO algorithm is able to guarantee a high Quality of Service (QoS) that concentrates on the number of satisfied users as well as the capacity of satisfied users as the two Key Performance Indicators (KPIs). Analytical derivations and simulations are discussed and used to evaluate the system performance for different traffic scenarios, and the results are presented.

Embodiments of the present invention provide a method and system for adjusting and potentially optimizing the powers of multiple carriers in a DAS-SFR system. By adjusting the power associated with the carriers provided by the central antenna of each cell, the SFR system enables higher system performance and an improved user experience as a result of higher system bandwidth.

Numerous benefits are achieved by way of the present invention over conventional techniques. For instance, embodiments of the present invention control the amount of resources allocated to users located in different areas, thereby increasing the frequency efficiency and also improving the data rate for cell edge users. As another example, embodiments of the present invention are useful in adjusting the powers of carriers to increase or maximize Key Performance Indicators, which are related to Quality of Service. These and other embodiments of the invention along with many of its advantages and features are described in more detail in conjunction with the text below and attached figures.

DETAILED DESCRIPTION OF SPECIFIC EMBODIMENTS

Figure 1:
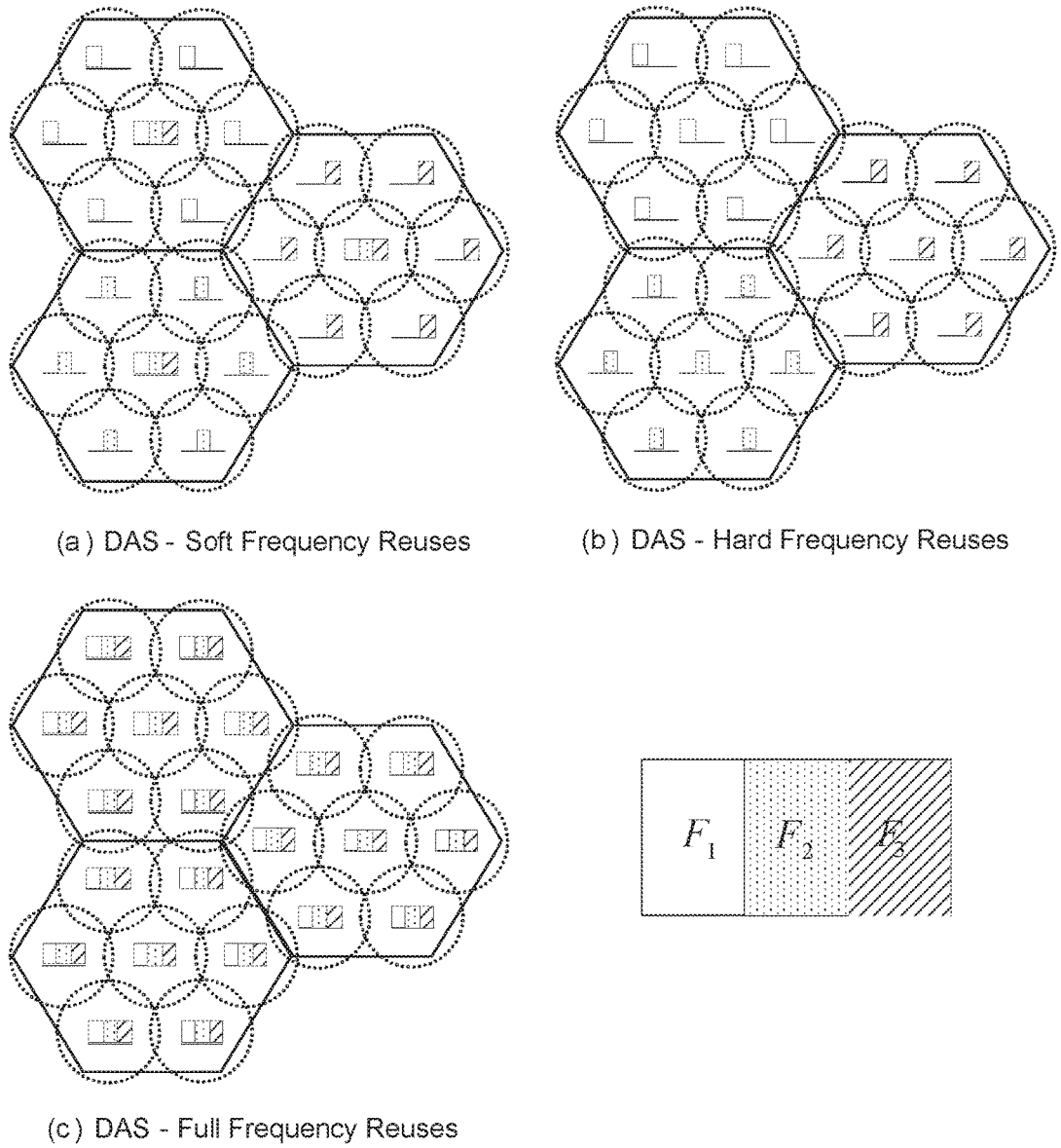
FIG. 1 illustrates band width allocation to antennas for three different combinations of DAS with SFR, HFR and FFR according to embodiments of the present invention.

In existing networks, parameters are manually adjusted to obtain a high level of network operational performance. 3GPP LTE is the preferred candidate for the next generation wireless networks. In the last 15 years, there has been substantial growth in cellular mobile communication systems. It is imperative to provide a high quality of service (QoS) at a minimum cost. With the substantial increase in cellular users, unbalanced throughput distributions are common in wireless networks which decrease the number of satisfied users. As traffic environments change, the network performance will not be optimum. Therefore, it is necessary to perform inter-cell optimization of the network dynamically according to the traffic environment, especially when cell traffic is not uniformly distributed. This is one of the important optimization issues in self-organizing networks (SON) for 3GPP LTE.

In SON, parameter tuning is done automatically based on measurements. The use of throughput-balancing is meant to deliver extra gain in terms of network performance. For throughput-balancing this is achieved by adjusting the network control parameters in such a way that ultra-high throughput users can offload to ultra-low throughput users inside the cell. In a live network, high throughput fluctuations occur. A SON enabled network, where the proposed SON algorithm monitors the network and reacts to these changes in throughput, can achieve better performance by distributing the throughput among users.

When the traffic loads among cells are not balanced, the satisfaction probability of heavily loaded cells may be lower, since their neighboring cells cause high inter-cell interference on cell edge users. In this case, throughput balancing can be conducted to alleviate and even avoid this problem.

Inter-cell interference, experienced by cell-edge users, is very high when this interference is a result of using the same subcarriers in the adjacent cell in the same time slot. High inter-cell interference means severe degradation of the cell-edge throughput since Mobile 3GPP LTE adopts a frequency reuse factor of one which is called Full Frequency Reuse (FFR), in which each cell serves users using the entire system bandwidth.

To mitigate the inter-cell interference in cellular systems, several techniques have been incorporated in these standards. Advanced receiver techniques such as Maximum Likelihood (ML) Multiuser Detection (MUD), the MMSE Receiver MUD and Other-cell interference cancellation are the three potential ways to reduce interference in cellular systems; however, these require a more complicated receiver. Advanced transmitter techniques such as Cooperative Encoding (CA), Closed-Loop MIMO Diversity Schemes (CLMD) and Beam forming are three other techniques to overcome the interference problem in cellular systems but CA requires very accurate channel state knowledge and real time inter-cell coordination, CLMD and Beam forming sacrifice spatial dimensions and require channel state knowledge.

One possible strategy to alleviate interference, both in the uplink and the downlink of cellular networks, is to reduce the overall transmit power by using a Distributed Antenna Systems (DAS), which also has the additional advantage of improving capacity and coverage.

The other possible strategy is a Soft Frequency Reuse technique; this technique effectively reduces the inter-cell interference by geographically spacing the competing transmissions farther apart, which benefits users near the cell boundaries.

A. Distributed Antenna System (DAS):

Distributed antenna systems (DAS) have been widely implemented in state-of-the art cellular communication systems to cover dead spots in wireless communications systems.

A DAS breaks the traditional radio base station architecture into two pieces: a central processing facility and a set of distributed antenna (DA), connected to the central facility by a high-bandwidth network. The DAS network transports radio signals, in either analog or digital form, to/from the central facility where all the base station's processing is performed. By replacing a single high-power antenna with several low-power antennas, distributed to give the same coverage as the single antenna, a DAS is able to provide more-reliable wireless services within a geographic area or structure while reducing its power consumption.

DAS has the following potential advantages such as: throughput improvement, coverage improvement, increased cellphone battery life and a reduction in transmitter power. Recent research has shown the benefits of using DAS in a cellular system for extending coverage, reducing call blocking rate and reducing inter-cell interference. An extension to a traditional DAS system is an Intelligent DAS, wherein each remote has the added flexibility of independently transmitting preselected carriers.

Most of the research on DAS has focused on investigating SINR advantages of DAS and analyzing its performance. Some research on DAS has focused on the analysis of the uplink performance due to its analytical simplicity, while there are few studies on the downlink performance of DAS, although the demand for high-speed data rate will be dominant in the downlink path. There is also very little research that considers the advantages of DAS in a multi-cell context.

B. Soft Frequency Reuse (SFR) Technique:

SFR has been proposed as an inter-cell interference mitigation technique in OFDMA based wireless networks. In SFR, the frequency band is divided into a fixed number of sub-bands; all sub-bands are used by all eNBs to serve "near" users; the other sub-bands are dedicated to "far" users. All sub-bands are allocated to the cells according to some predefined reuse factor. The SFR assigns sub-bands limited amount of transmit power to reduce inter-cell interference. The transmit power needs to be reduced enough to provide the required throughput to cell edge users of neighboring cells. Also, the sub-bands of reduced transmit power are used for the inner cell users.

Hard Frequency Reuse (HFR) suffers from a reduced spectral efficiency in such a way that, in HFR, the frequency band is divided into a fixed number of sub-bands that are allocated to the cells according to some predefined reuse factor and lets neighboring cells transmit on different sub-bands. On the other hand, SFR has the benefit of a full spectral efficiency and is a strong mechanism for inter-cell interference mitigation.

The capacity of the SFR was evaluated in assuming the offset in the transmit powers of different sub-bands. Self-organization of the transmit power in the uncoordinated systems was illustrated in where some transient time is required to converge on the equilibrium state of power allocation. Recent research on SFR has focused on optimal system design utilizing advanced techniques such as graph theory and convex optimization to maximize network throughput. Additional work on FFR and SFR consider alternative schedulers and the authors determined the frequency partitions in a two-stage heuristic approach.

Accordingly, this paper proposes a new architecture to suppress inter-cell interference. The proposed architecture combines DAS and SFR for an OFDMA system (e.g. LTE). We analyze the potential gains of DAS-SFR in a multi-cell environment.

The proposed architecture divides the entire spectral bandwidth F into 3 parts ($F_1$, $F_2$, $F_3$). The system assigns the eNB the full-reused frequency (all 3 parts) to the central antenna and the other 6 edge antennas work only on 1 part based on a reuse factor of $\Delta$ (ie. $\Delta=3$) in such a way that neighbor cell edge antennas do not use the same frequency, FIG. 1 (a). Two other combinations of DAS with HFR and FFR are also demonstrated in FIG. 1 (b) and FIG. 1 (c), respectively.

In order to attain user satisfaction, a minimum throughput should be provided for all users. In this publication, the system QoS is a function of the number of satisfied users. For a DAS-SFR architecture, the cell-edge throughput can be improved due to the reduced inter-cell interference as well as from the boosted cell-center transmission power. However, as compared to FFR the overall network throughput decreases at the same time, since the improvement is obtained at the cost of the cell-center user throughput. Thus, an efficient resource allocation and power allocation scheme is required to achieve the optimum overall network throughput in the DAS-SFR implementation.

Therefore, to improve the throughput for the cell edge users and further increase the number of satisfied users (the users that can achieve a targeted service bitrate), a downlink Power Self-Optimization (PSO) algorithm for three different resource allocation scenarios is proposed for the DAS-SFR. The transmit powers are allocated so that the spectral efficiency is maximized for the DAS-SFR, and the number of satisfied users is also maximized. The spectral efficiency represented by the ergodic capacity is obtained for the different scenarios. The results show that a DAS-SFR architecture effectively addresses inter-cell interference in a multi-cell environment, especially at the cell boundaries when compared to a HFR cellular architecture. The results also show that a DAS-SFR architecture achieves a non-trivial capacity enhancement over a HFR cellular architecture for a frequency reuse factor of 3.

A contribution of this work is the development of an analytical framework to evaluate the ergodic capacity of a DAS-SFR architecture. This is an important metric to consider, especially for users at the cell-edge since modern cellular networks are increasingly required to provide users with high data-rate and a guaranteed quality-of-service (QoS). This work presents a strategy for optimally allocating frequency RBs to edge users in a DAS-SFR architecture, based on a chosen performance threshold, which we define as $T_p$.

A system model is presented in section II. In section III, the achievable capacity is derived for a distributed antenna system. Formulation of the Power allocation algorithm is discussed in section IV. Analytical and simulation results are shown in section V and a conclusion is provided in section VI.

II. System Model

Figure 2:
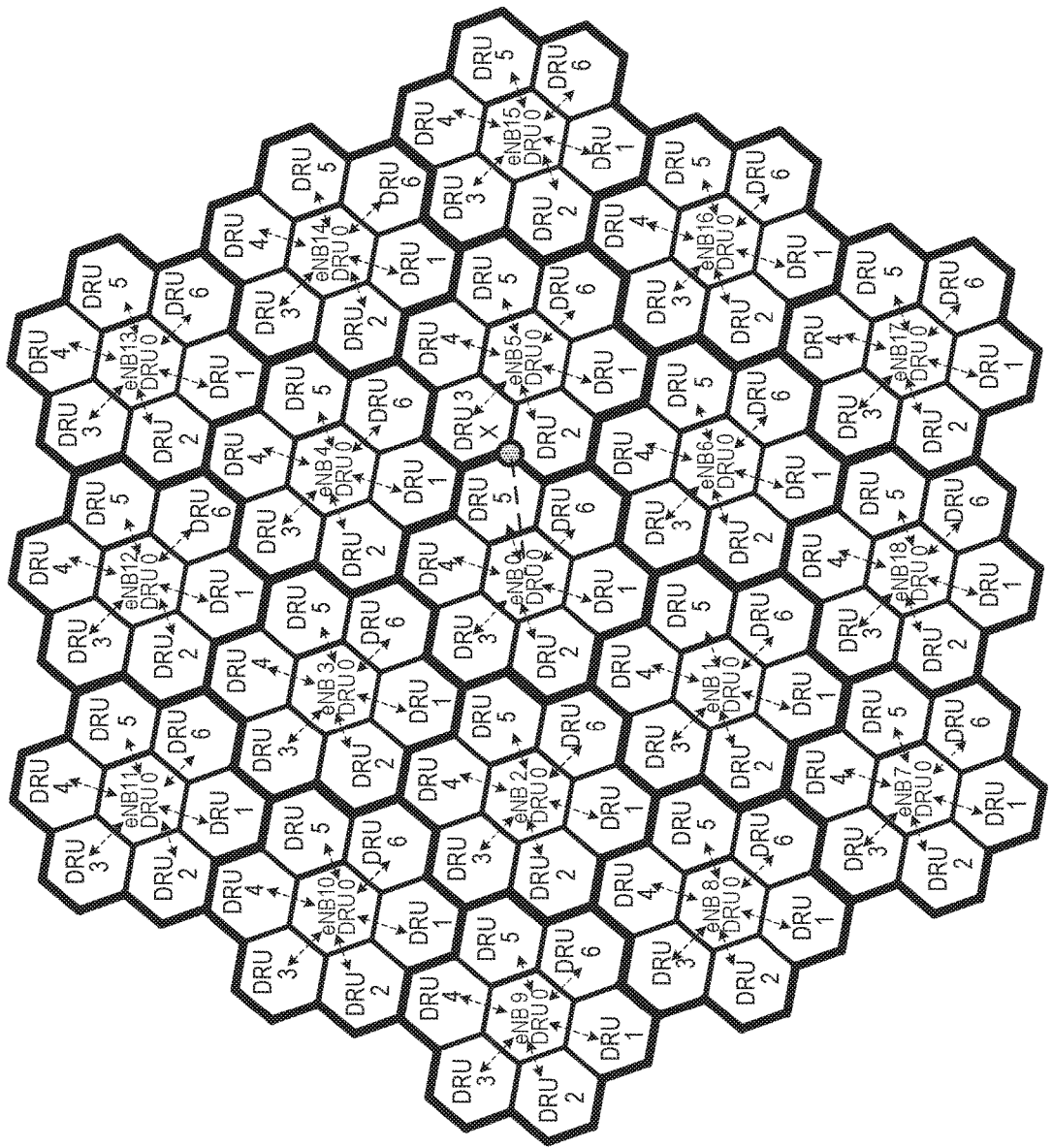
FIG. 2 illustrates the structure of a Distributed Antenna System according to an embodiment of the present invention.

A. System Architecture:

The general architecture of an intelligent DAS in a multi-cell environment is shown in FIG. 2, where 7 Digital Remote Units (DRUs) are connected to an eNB via an optical fiber and a Digital Access Unit (DAU). The DAUs are interconnected and connected to multiple sectors. This capability enables the virtualization of the eNB resources at the independent DRUs. The eNBs are linked to a public switched telephone network or a mobile switching center. DRUs are sectorized in such a way that each DRU allocated to a given eNB sector can be simulcast. For the simulcasting operation, the access network between each eNB and its DRUs should have a multi-drop bus topology. In contrast, the same area (7 DRUs) is covered by a single high-power eNB in a traditional cellular system.

The total transmit power of the n-th DRU of i-th cell in f-th frequency part is denoted $P_n^{(i,f)}$, where the central DRU of each cell is index by n=0.

We also consider the 2-tier cellular structure, where two continuous tiers of eighteen cells surround a given cell. Although this assumption of only 2-tiers of interfering cells is optimistic, a pessimistic assumption that all the DRUs and the eNB are transmitting full power all the time easily compensates.

B. Resource Allocation Scenarios:

In a multiuser DAS-SFR system, different users are located at varying distances from the DRUs and have varying channel conditions on the subcarriers. Therefore, resource allocation allows for efficient exploitation of multiuser diversity in the system.

Much of the research on SFR system design has focused on how to determine the size of the frequency partitions, for example, in a typical LTE system with a bandwidth of 5 MHz, 25 RBs may be available to serve users for each frequency part ($F_i$, i=1, 2, 3).

For a typical central cell, we can assume that the center DRU is assigned to the full-reused frequency and the other six edge DRUs are assigned to $F_1$. Now, we consider three resource allocation scenarios:

Scenario 1: $F_1$, $F_2$, $F_3$ RBs are assigned to all users in the cell. Note that in this scenario, the very low SINR exterior users are inefficiently using the $F_2$ and $F_3$ RBs.

Scenario 2: $F_1$ RBs are assigned to all users but $F_2$ and $F_3$ RBs are solely assigned to interior users. Note that in this scenario, the available RBs are fully assigned to the interior users, which leads to a big gap between the numbers of allocated RBs to the interior users as compared to the exterior users.

Scenario 3: $F_1$ RBs are solely assigned to the exterior users, whereas the $F_2$ and $F_3$ RBs are assigned to the interior users. In this scenario, all RBs are more fairly assigned between all users, as compared to the previously mentioned scenario. Moreover, in this scenario the RBs are allocated to the users following a SINR-based approach, in which the edge users using the $F_1$ RBs, and the interior users using the $F_2$ and $F_3$ RBs have a high SINR.

We primarily assume a single user scenario, and further extend it to a uniformly distributed multiuser LTE system. In a multiuser scenario, we investigate both the analytical and the simulation results in order to verify the system's capacity improvement.

Received Signal and Channel Model

Figure 3:
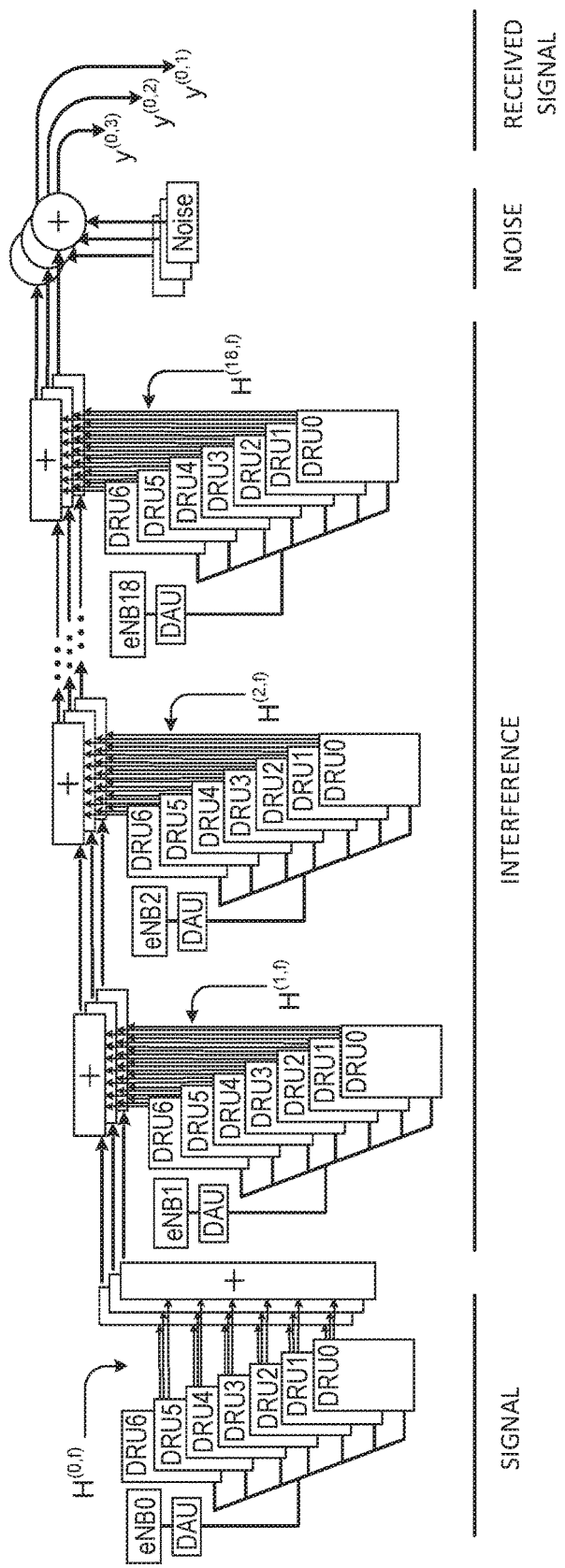
FIG. 3 illustrates a block diagram of the Received Signals with Interference Signals and Noises according to an embodiment of the present invention.

The downlink path of a DAS can be considered as an equivalent MIMO system with additive interference and noise (FIG. 3). The received signal vector of the user in the central cell at frequency f can be expressed as, $$y^{(0,f)} = \text{signal} + \text{interference} + \text{noise} \quad (1)$$

$$= H^{(0,f)} x^{(0,f)} + \sum_{i=1}^{18} H^{(i,f)} x^{(i,f)} + n^{(f)}$$

where $H^{(i,f)} \in \mathbb{C}^{1 \times 7}$, i=0, 1, . . . , 18, denotes the channel matrix between the DRUs in the i-th cell and the user in the central cell, $x^{(i,f)} = [x_0^{(i,f)}, x_1^{(i,f)}, \ldots, x_6^{(i,f)}]^T \in \mathbb{C}^{7 \times 1}$, i=0, 1, . . . , 18 is the transmitted signal vector of the DRUs in the i-th cell, $n^{(f)} \in \mathbb{C}^{1 \times 1}$ denotes the white noise vector with distribution $CN(0, \sigma_n^2 I_1)$. The distributed antenna power constraint is considered, we have $$E[|x_n^{(i,f)}|^2] \le P_n^{(i,f)}, n = 0, 1, \ldots, 6, \quad (2)$$

$$i = 0, 1, \ldots, 18,$$

where in DAS-SFR, $x_n^{(i,F_1)}=0$, $P_n^{(i,F_1)}=0$ when (n=1, 2, . . . , 6 and i=1, 2, . . . , 7, 9, 11, 13, 15, 17), $x_n^{(i,F_2)}=0$, $P_n^{(i,F_2)}=0$ when (n=1, 2, . . . , 6 and i=0, 2, 4, 6, 7, 8, 10, 11, 12, 14, 15, 16, 18), $x_n^{(i,F_3)}=0$, $P_n^{(i,F_3)}=0$ when (n=1, 2, . . . , 6 and i=0, 1, 3, 5, 8, 9, 10, 12, 13, 14, 16, 17, 18), in DAS-HFR3 (frequency reuse factor 3),
$x_n^{(i,F_1)}=0$, $P_n^{(i,F_1)}=0$ when (n=1, 2, ..., 6 and i=1, 2, ..., 7, 9, 11, 13, 15, 17),
$x_n^{(i,F_2)}=0$, $P_n^{(i,F_2)}=0$ when (n=1, 2, ..., 6 and i=0, 2, 4, 6, 7, 8, 10, 11, 12, 14, 15, 16, 18),
$x_n^{(i,F_3)}=0$, $P_n^{(i,F_3)}=0$ when (n=1, 2, ..., 6 and i=0, 1, 3, 5, 8, 9, 10, 12, 13, 14, 16, 17, 18),
in DAS-FFR,
$x_n^{(i,f)} \neq 0$, $P_n^{(i,f)} \neq 0$ when (n=0, 1, ..., 6 and i=0, 1, ..., 18, f=$F_1$, $F_2$, $F_3$),
where $P_n^{(i,f)}$ denotes the power constraint of the n-th DRU in the i-th cell for frequency band f.

The composite fading channel matrix $H^{(i,f)}$, i=0, 1, ..., 18, encompasses not only small-scale fading (fast fading) but also large-scale fading (slow fading), which is modeled as $$H^{(i,f)} = H_w^{(i,f)} L^{(i,f)} \quad (3)$$
$$= [h_0^{(i,f)}, h_1^{(i,f)}, \ldots, h_6^{(i,f)}] \cdot \text{diag}\{l_0^{(i,f)}, l_1^{(i,f)}, \ldots, l_6^{(i,f)}\}$$

where, $H_w^{(i,f)}$ and $L^{(i,f)}$ reflect the small-scale channel fading and the large-scale channel fading between the DRUs in the i-th cell and the user in the central cell, respectively. $\{h_j^{(i,f)}|j=0, 1, \ldots, 6; i=0, 1, \ldots, 18; f=F_1, F_2, F_3\}$ are independent and identically distributed (i.i.d) circularly symmetric complex Gaussian variables with zero mean and unit variance, and $\{l_j^{(i,f)}|j=0, 1, \ldots, 6; i=0, 1, \ldots, 18; f=F_1, F_2, F_3\}$ can be modeled as $$l_n^{(i,f)} = \sqrt{[D_n^{(i)}]^{-\gamma} X_n^{(i,f)}}, n=0,1,\ldots,6, i=0,1,\ldots,18 \quad (4)$$

Where $D_n^{(i)}$ and $X_n^{(i,f)}$ are independent random variables representing the distance and the shadowing between the user in the central cell and the n-th DRU in the i-th cell, respectively. $\gamma$ denotes the path loss exponent.
$\{X_i^{(i,f)}|j=0, 1, \ldots, 6; i=0, 1, \ldots, 18; f=F_1, F_2, F_3\}$ are i.i.d random variables with probability density function (PDF)

$$f_X(\chi) = \frac{1}{\sqrt{2\pi} \lambda \sigma_\chi \chi} \exp\left(-\frac{(\ln \chi)^2}{2\lambda^2 \sigma_\chi^2}\right), \chi > 0, \quad (5)$$

Where $\sigma_x$ is the shadowing standard deviation and $$\lambda = \frac{\ln 10}{10}.$$

Since the number of interfering sources is sufficiently large and interfering sources are independent with each other, the interference plus noise is assumed to be a complex Gaussian random vector as follows:

$$N^{(f)} = \sum_{i=1}^{18} H^{(i,f)} x^{(i,f)} + n^{(f)} \quad (6)$$

The variance of N is derived by Central Limit Theorem as $$\text{Var}(N^{(f)}) = \left[\sum_{i=1}^{18} \sum_{n=0}^{6} [l_n^{(i,f)}]^2 P_n^{(i,f)} + \sigma_n^{2(f)}\right] I_1 \quad (7)$$

-continued
$$= [\sigma^{(f)}]^2 I_1$$

Therefore, the received signal at the mobile station at a given symbol duration is given by $$y^{(0,f)} = H_w^{(0,f)} L^{(0,f)} x^{(0,f)} + N^{(f)} \quad (8)$$

Dynamic Power Allocation

In DAS-SFR, it is important to dynamically change the frequency bands power of each DRU to cope with a dynamically changing distribution of traffic and to balance the throughput in each cell. Thus, it is necessary to dynamically change the frequency bands power such that the maximum number of users in each cell could be satisfied (number of users that can achieve the targeted service bitrate). In this study we are interested in a proper power allocation which maximizes the number of satisfied users and their capacity. Without proper power allocation, there may be cases of unbalanced capacity (throughput) where a few users can have ultra-high throughput and most of the users have ultra-low throughput. In some cases, for the existence of very large interference, some users will be always unsatisfied. Therefore, a proper power allocation can increase the throughput of the rest of the users. However, the number of unsatisfied users' throughput will be decreased.

III. Achievable capacity of Distributed Antenna System

If we assume that the channel state information is known only at the receiver (CSIR) and the channel is ergodic, the ergodic Shannon capacity at a given location of the target mobile station for the central cell can be calculated by $$C^{(f)} = E_{H_w^{(0,f)}}\left[\log_2 \det\left(I_1 + \frac{1}{[\sigma^{(f)}]^2}(H_w^{(0,f)} L^{(0,f)}) P^{(0,f)} (H_w^{(0,f)} L^{(0,f)})^H\right)\right] \quad (9)$$

where $P^{(0,f)}$ is the covariance matrix of the transmitted vector x and given by $\text{diag}\{P_0^{(0,f)}, P_1^{(0,f)}, \ldots, P_6^{(0,f)}\}$. If ergodicity of the channel is assumed, the ergodic capacity can be obtained as $$C^{(f)} = E_{H_w^{(0,f)}}\left[\log_2\left(1 + \frac{1}{[\sigma^{(f)}]^2}\sum_{i=0}^{6} |h_i^{(0,f)}|^2 [l_i^{(0,f)}]^2 P_i^{(0,f)}\right)\right] \quad (10)$$

$$= \int_{\gamma_f=0}^{\infty} \log_2(1+\gamma_f) f_{\gamma_f}(\gamma_f) d\gamma_f$$

where $$\gamma_f = \frac{1}{[\sigma^{(f)}]^2} \sum_{i=0}^{6} |h_i^{(0,f)}|^2 [l_i^{(0,f)}]^2 P_i^{(0,f)}$$

is a weighted chi-squared distributed random variable with p.d.f given by $$f_{\gamma_f}(\gamma_f) = \sum_{i=0}^{6} \frac{[\sigma^{(f)}]^2 \pi_i}{[l_i^{(0,f)}]^2 P_i^{(0,f)}} \exp\left(-\frac{[\sigma^{(f)}]^2 \gamma_f}{[l_i^{(0,f)}]^2 P_i^{(0,f)}}\right), \quad (11)$$

where $$\pi_i = \prod_{k=0, k \neq i}^{6} \frac{[l_i^{(0,f)}]^2 P_i^{(0,f)}}{[l_i^{(0,f)}]^2 P_i^{(0,f)} - [l_k^{(0,f)}]^2 P_k^{(0,f)}}.$$

Then the ergodic capacity for MISO vector channel can be obtained in a simple form by $$\text{MISO: } C^{(f)} = -\frac{1}{\ln 2} \sum_{i=0}^{6} \pi_i \exp\left(-\frac{[\sigma^{(f)}]^2}{[l_i^{(0,f)}]^2 P_i^{(0,f)}}\right) Ei\left(-\frac{[\sigma^{(f)}]^2}{[l_i^{(0,f)}]^2 P_i^{(0,f)}}\right), \quad (12)$$

$$f = F_1, F_2, F_3$$

where, Ei(t) is the exponential integral function $$\left(Ei(t) = -\int_{-x}^{\infty} e^{-t}/t \, dt\right)$$

and can be easily calculated with popular numerical tools such as MATLAB and MAPLE.

Since the derivation for this MISO vector channel is a generalization of a SISO channel, the ergodic capacity for SISO channel is given, respectively, by $$\text{SISO: } C^{(f)} = -\frac{1}{\ln 2} \exp\left(-\frac{[\sigma^{(f)}]^2}{[l_0^{(0,f)}]^2 P_0^{(0,f)}}\right) Ei\left(-\frac{[\sigma^{(f)}]^2}{[l_0^{(0,f)}]^2 P_0^{(0,f)}}\right), \quad (13)$$

$$f = F_1, F_2, F_3$$

Hence, the total ergodic capacity of the system can be obtained by adding the capacity of the individual carriers, $$C_{total} = C^{(F_1)} + C^{(F_2)} + C^{(F_3)} \quad (14)$$

where, for DAS-SFR at the central cell,
$C^{(F_1)}$: MISO, $C^{(F_2)}$: SISO, $C^{(F_3)}$: SISO
for DAS-HFR3 (frequency reuse factor 3) at the central cell,
$C^{(F_1)}$: MISO, $C^{(F_2)}$: nothing, $C^{(F_3)}$: nothing
for DAS-FFR at the central cell,
$C^{(F_1)}$: MISO, $C^{(F_2)}$: MISO, $C^{(F_3)}$: MISO In the following section, we present the analytical and numerical results using a simulation to corroborate the theoretical analysis.

IV. Formulation of Power Allocation

In this section, we formulate the power allocation problem to maximize the number of satisfied users and also maximize the total satisfied users capacity.

For the problem formulation we consider a service area with nineteen cells shown in FIG. 2.

In a multiusers scenario, we can directly map the ergodic capacity of each user to what we obtained in section III depending on the position and the power. Therefore, having a number off resource blocks assigned to user $k(N_k^{RB(f)})$, the real throughput at user k can be written in terms of bps (bit per second) as follow, $$C_k^{real}(P) = W_{RB} \sum_{i=1}^{3} N_k^{RB(F_i)} \cdot C_k^{(F_i)}(P) \quad (15)$$

where, $W_{RB}$ is the resource block bandwidth. $C_k^{(F_i)}(P)$ is the ergodic capacity of user k where $$P = \{P_n^{(i,f)} | n=0,1,\ldots,6, i=0,1,\ldots,18, f=1,2,3\}.$$

We consider the following key performance indicators (KPIs) in the power allocation system:

1. $\text{KPI}_{SU}$ (Number of Satisfied Users): We can derive a metric defining a percent of satisfied users (i.e., users that can achieve the targeted service bit rate, for example, 1 Mbits/s). The percent of satisfied users (out of m users) would be, $$KPI_{SU}(P) = \frac{\sum_{k=1}^{m} G_k(P)}{N_{user}^{total}} \quad (16)$$

where $N_{user}^{total}$ is total number of users and $$G_k(P) = \begin{cases} 1 & \text{when } C_k^{real}(P) > C_{th} \\ 0 & \text{otherwise} \end{cases}$$

Using these equations, $C_{th}$ is a threshold capacity (targeted service bit rate) and $G_k(P)$ is unity when the capacity for a user (indexed by k) exceeds the threshold capacity and is equal to zero when the capacity is less than or equal to the threshold capacity.

2. $\text{KPI}_{CSU}$ (Capacity of Satisfied Users): The total capacity of satisfied users would be, $$KPI_{CSU}(P) = \frac{\sum_{k \in SUS} C_k^{real}(P)}{(W_{(F_1)} + W_{(F_2)} + W_{(F_3)})/3} \quad (17)$$

where $W_f$ is the bandwidth of frequency band f and $SUS = \{k | G_k = 1, k=1, 2, \ldots, m\}$ is the satisfied users set. If more than three carriers are utilized in a cell, the number of carriers and the divisor in the denominator will increase as appropriate.

Now, our QoS function is the weighted combination of the two KPIs (cost factors) which we have already introduced. Obviously our objective function is to maximize the QoS function.

$$\underset{P}{\text{Maximize}} \; QoS(P) = w_1 \cdot KPI_{SU}(P) + w_2 \cdot KPI_{CSU}(P) \quad (18)$$

We can further simplify the objective functions in Eq.18 based on the following arguments:
Use round robin scheduling and equal bandwidth frequency for all frequency bands, therefore, we can rewrite the real capacity in Eq. 15 as, $$C_k^{real}(P) = W_{RB} \sum_{i=1}^{3} N_k^{RB(F_i)}. \quad (19)$$

$$C_k^{(F_i)}(P) \xrightarrow{\text{Round Robin}} W_{RB} \sum_{i=1}^{3} \frac{N_{RB}^{(F_i)}}{N_{user}^{(F_i)}} C_k^{(F_i)}(P) \xrightarrow{W_{RB} N_{RB}^{(F_i)} = W_{(F_i)}}$$

$$\sum_{i=1}^{3} \frac{W_{(F_i)}}{N_{user}^{(F_i)}} C_k^{(F_i)}(P) \xrightarrow{W_{(F_1)}=W_{(F_2)}=W_{(F_3)}=W_F} W_F \sum_{i=1}^{3} \frac{C_k^{(F_i)}(P)}{N_{user}^{(F_i)}}$$

Where $N_{user}^{(f)}$ is the number of users which can be supported by frequency band f.

Since it is not practical to calculate the ergodic capacity for the individual users, the aforementioned simplification is valid for the theoretical analysis and cannot be extended to practical applications. However, in practice, the number of the satisfied users and therefore the KPIs, are found based on the real users' throughput ($C_k^{real}(P)$) after the power allocation procedure.

Note that, the optimization problem variable (P) is 171=19×9, where the first term in the product is due to the fact that we have 19 cells, and the second term is because each cell of DAS-SFR has 9 changeable user frequency band powers. These 9 changeable user frequency band powers are comprised of 6 frequency band powers for the edge DRUs and 3 frequency band powers for central DRUs.

We decrease the optimization problem variable from 171 to 1 in such a way that only the central DRU's frequency bands power, which are not assigned to the edge DRUs, are perturbed. The central DRU's $F_2$ and $F_3$ power, which are not assigned to the edge DRUs, are perturbed for the central cell (eNB0) in a DAS-SFR configuration.

So the optimization problem is simplified to, $$\underset{\Delta P}{\text{Maximixe}} \; QoS(\Delta P) = w_1 \cdot KPI_{SU}(\Delta P) + w_2 \cdot KPI_{CSU}(\Delta P) \quad (20)$$

where in DAS-SFR,

SFR, since none of the DRUs except the central DRU operates in $F_2$ and $F_3$, it is possible to apply the above-mentioned method (distinguishing between the interior and the exterior users) using the received CQIs (Channel Quality Indicator) from $F_2$ and $F_3$. To implement these techniques, we propose a threshold $T_p$ as a parameter in the eNB such that users with uplink power higher than $T_p$ are assigned as interior users, and vice versa. In a DAS-SFR, $T_p$ can play the same role as a threshold for CQI such that users with CQI higher than $T_p$ are assigned as interior users, and vice versa.

A. The Power Self-Optimization Algorithm

According to the above intuitive analysis, we propose a power self-optimization (PSO) technique which is based on a simple and decentralized algorithm that runs on the application layer.

Figure 4:
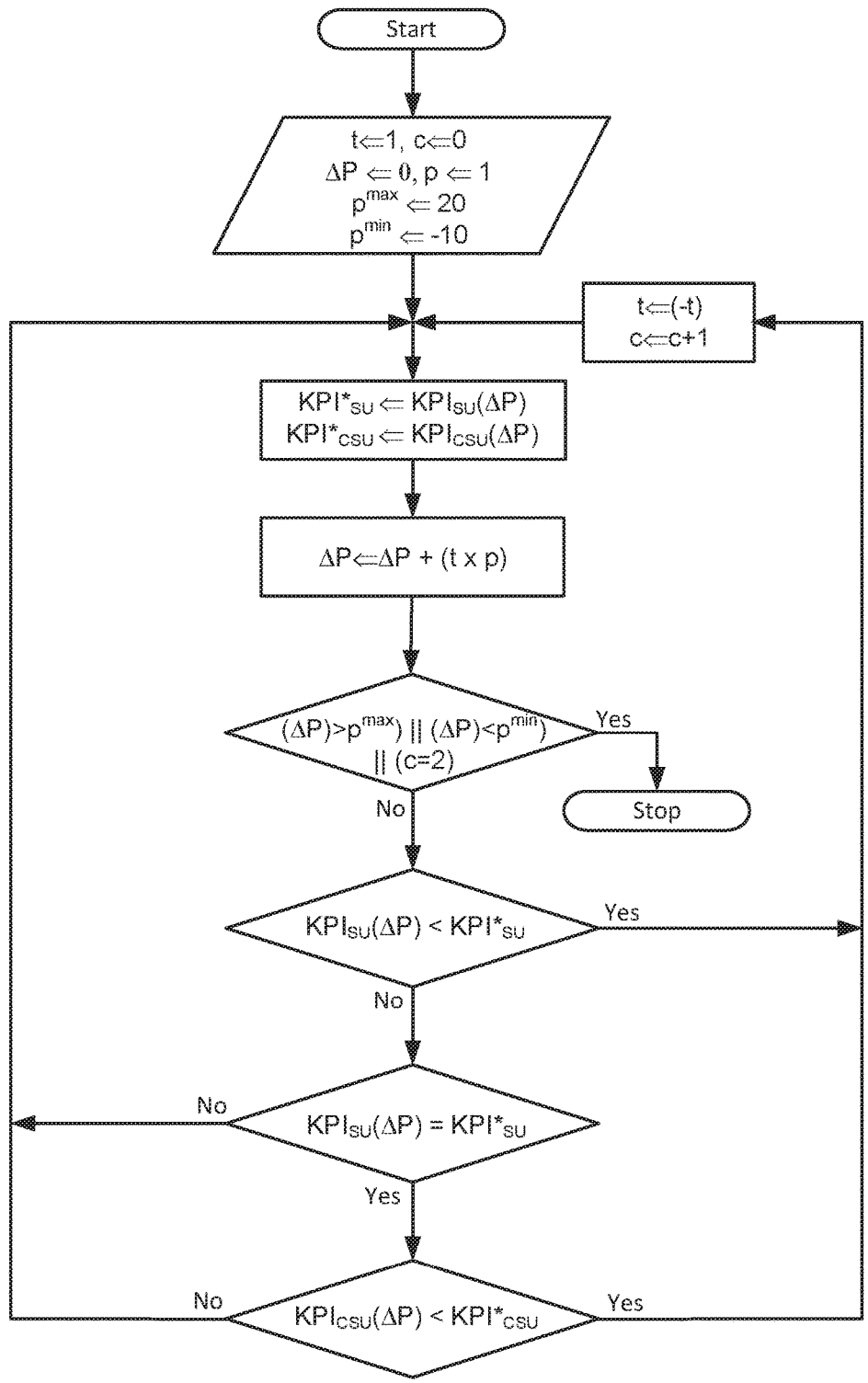
FIG. 4 is a simplified flowchart illustrating the PSO algorithm according to an embodiment of the present invention.

In the PSO algorithm, the expected network gain, which is based on one or both system KPIs, is used in order to determine whether to increase or decrease the transmission power of the central DRUs. To do so, the PSO technique uses the KPI associated with each eNB to compute the system KPI. Finally, the central DRUs are in charge of adjusting $\Delta P$ based on system KPI by performing the PSO algorithm. FIG. 4 depicts the block diagram of the self-optimization algorithm. As illustrated in FIG. 4, both KPIs are functions of $\Delta P$.

Observing the block diagram shown in FIG. 4, it is possible to note that the transmission power is adjusted by comparing the current KPI, calculated at the end of current phase, and the last KPI, calculated at the end of last phase. Moreover, it is important to highlight that the central DRUs have a predefined minimum and maximum transmission power ($p^{min}$ and $p^{max}$), which cannot be exceeded by the algorithm. Thus, the self-optimization algorithm increases or decreases the $\Delta P$ step-by-step by p (dB) for each central $$\Delta P(\text{dB}) = P'(\text{dBm}) - P(\text{dBm})$$

$$P_n^{(i,f)} = \begin{cases} P \text{ when} & (n=0,1,\ldots,6 \text{ and } i=0,8,10,12,14,16,18 & \text{and } f=F_1) \text{ or} \\ & (n=0,1,\ldots,6 \text{ and } i=1,3,5,9,13,17 & \text{and } f=F_2) \text{ or} \\ & (n=0,1,\ldots,6 \text{ and } i=2,4,6,7,11,15 & \text{and } f=F_3), \\ P' \text{ when} & (n=0) \text{ and } i=1,2,\ldots,7,9,11,13,15,17 & \text{and } f=F_1) \text{ or} \\ & (n=0) \text{ and } i=0,2,4,6,7,8,10,11,12,14,15,16,18 & \text{and } f=F_2) \text{ or} \\ & (n=0) \text{ and } i=0,1,3,5,8,9,10,12,13,14,16,17,18 & \text{and } f=F_3), \\ 0 \text{ otherwise} \end{cases}$$

$$KPI_{SU}(\Delta P) = \frac{\sum_{k=1}^{m} G_k(\Delta P)}{N_{user}^{total}} \text{ where } G_k(\Delta P) = \begin{cases} 1 \text{ when } \sum_{i=1}^{3} \frac{C_k^{(F_i)}(\Delta P)}{N_{user}^{(F_i)}} > \frac{C_{th}}{W_F}, \\ 0 \text{ otherwise} \end{cases}$$

$$KPI_{CSU}(\Delta P) = \sum_{k \in SUS} \sum_{i=1}^{3} \frac{C_k^{(F_i)}(\Delta P)}{N_{user}^{(F_i)}}$$

In our analysis, we assume that P is fixed and only P' changes in magnitude.

In multiuser systems, we need to consider the different resource allocation scenarios which were defined in section II. B In LTE systems, eNB distinguishes between the interior and the exterior users based on their corresponding uplink power received at the central DRU. Particularly in DAS- DRUs. Parameter t can take two values, 1 and −1, where 1 shows that algorithm starts by increasing the power level. Conversely, −1 indicates that the algorithm starts by decreasing the power level. Since we do not want the power to oscillate around the optimal power forever, we define the parameter c to help the algorithm stop.

Whenever the algorithm starts off by increasing the power level, the central DRUs increase the $\Delta P$ by the fixed parameter p. The central DRU keep increasing the power by the fixed parameters p as long as the current calculated $KPI_{SU}$ is greater than the last calculated $KPI_{SU}$. If the current calculated $KPI_{SU}$ is equal to last calculated $KPI_{SU}$, the central DRUs keep increasing the power as long as the current calculated $KPI_{CSU}$ is not smaller than the last calculated $KPI_{CSU}$, otherwise it decreases its power level. Note that whenever the algorithm starts off by increasing the power level, all the above mentioned statements should be reversed i.e. the decreasing behavior should be changed to an increasing behavior and vice versa.

The PSO algorithm seeks to maximize the number of satisfied users meanwhile it seeks to maximize the capacity of the satisfied users in order to have a better QoS. Even though some embodiments do not achieve an optimal solution, the methods described herein provide stable power updates toward the optimal solution. In other embodiments, the optimal solution is obtained.

Referring to FIG. 4, $KPI_{SU}$ is the Key Performance Indicator for Satisfied Users and $KPI_{CSU}$ is the key performance indicator for the Capacity of Satisfied Users. $\Delta P$ is the change in power of the carriers. By adjusting the power of the carriers, the number of satisfied users and the capacity of the satisfied users can be increased or optimized. Initially, t is set to 1, c is set to zero, $\Delta P=0$, and p=1 (i.e., the power increments are made in 1 dBm steps). In the illustrated embodiment, the maximum and minimum values of power (measured in dBm in an embodiment) are 20 and −10, respectively. In some implementations, the maximum and minimum power are set by the user and the values provided herein are merely given by way of example. Thus, depending on the system parameters, different values will be utilized for the maximum and minimum power. One of ordinary skill in the art would recognize many variations, modifications, and alternatives.

A measurement of the $KPI_{SU}$ given $\Delta P$ (initially zero, for which the power of the various carriers is equal) is made and the result is assigned to $KPI^*_{SU}$. Thus, the performance for the users in a given cell is measured to determine the number of satisfied users in the cell. The capacity for the satisfied users is also measured at this value of $\Delta P$ ($KPI_{CSU}$ given $\Delta P$) and assigned to $KPI^*_{CSU}$.

The difference in power is then modified ($\Delta P+(t*p)$) in order to iterate on the difference in power. t is an updating index that has values of positive or negative one, indicating if the difference in power is being increased or decreased. Referring to FIG. 4, movement through the left hand side of the loop results in increases in power and movement through the right hand side of the loop results in decreases in power.

In order to determine if the power is in the correct range, a comparison is made between $\Delta P$ and the maximum power ($\Delta P > p^{max}$), between $\Delta P$ and the minimum power ($\Delta P < p^{min}$), and that an oscillation indicator (c) is not reached. If any of these conditions are true, then the method is terminated. Otherwise, if the power is within the predetermined range (less than maximum power and greater than the minimum power) and oscillation has not been detected, the method continues.

A measurement is made of the number of satisfied users given the new $\Delta P$ ($KPI_{SU}(\Delta P)$) and this measured value is compared to the previous number of satisfied users. If the change in power (an increase in this example) has resulted in a decrease in the number of satisfied users, then the right hand loop is used to toggle the updating index (t), which will enable the power to be decreased in the subsequent flow.

If, on the other hand, the number of satisfied users given the new $\Delta P$ is greater than or equal to the previous number of satisfied users, indicating no change or an increase in the number of satisfied users, the method proceeds to the next comparison to determine if the number of satisfied users given the new $\Delta P$ is equal to the previous number of satisfied users. If the comparison is not equal, then the left hand side of the loop is used to increase the power differential in the subsequent flow.

If the number of satisfied users given the new $\Delta P$ is equal to the previous number of satisfied users, then a measurement is made of the capacity of the satisfied users and this value is compared to the previous capacity. If the measured capacity is less than the previous capacity, the right hand side of the loop is used to decrease the power differential in the subsequent flow. If the measured capacity is greater than or equal to the previous capacity, then the left hand side of the loop is used to increase the power differential in the subsequent flow.

Referring to FIG. 1, the method illustrated in FIG. 4 will be applied in relation to the carriers used in the central antenna (eNB0) of the cell (i.e., hexagon). For each cell, the carrier used in the peripheral portions of the cell will be used as a reference and the other carriers will have their power set by optimizing the number and capacity of satisfied users using the algorithm described herein. In some embodiments, the carriers used in the central antenna that are not used in the peripheral portions of the cell will have the same power, providing a single $\Delta P$ for the central antenna with the carrier used in the peripheral portions of the cell providing the reference. In some implementations, the carriers used only in the central antenna can have differing powers with the algorithm applied to the carriers individually (e.g., $F_1$ compared to $F_3$ and $F_2$ compared to $F_3$ for the rightmost cell in FIG. 1A).

Referring to FIG. 1A, $F_1$ is the reference for the top left cell, $F_2$ is the reference for the bottom left cell, and $F_3$ is the reference for the rightmost cell. One of ordinary skill in the art would recognize many variations, modifications, and alternatives. Embodiments of the present invention provide methods and systems in which the number of carriers in a cell can be increased, thereby increasing bandwidth. The algorithm is then used to set the power level of the added carriers to a level that reduced interference with adjacent cells to an acceptable level.

It should be appreciated that the specific steps illustrated in FIG. 4 provide a particular method of increasing a number and capacity of satisfied users by varying power between carriers according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

V. Analytical and Simulation Results

Figure 5A:
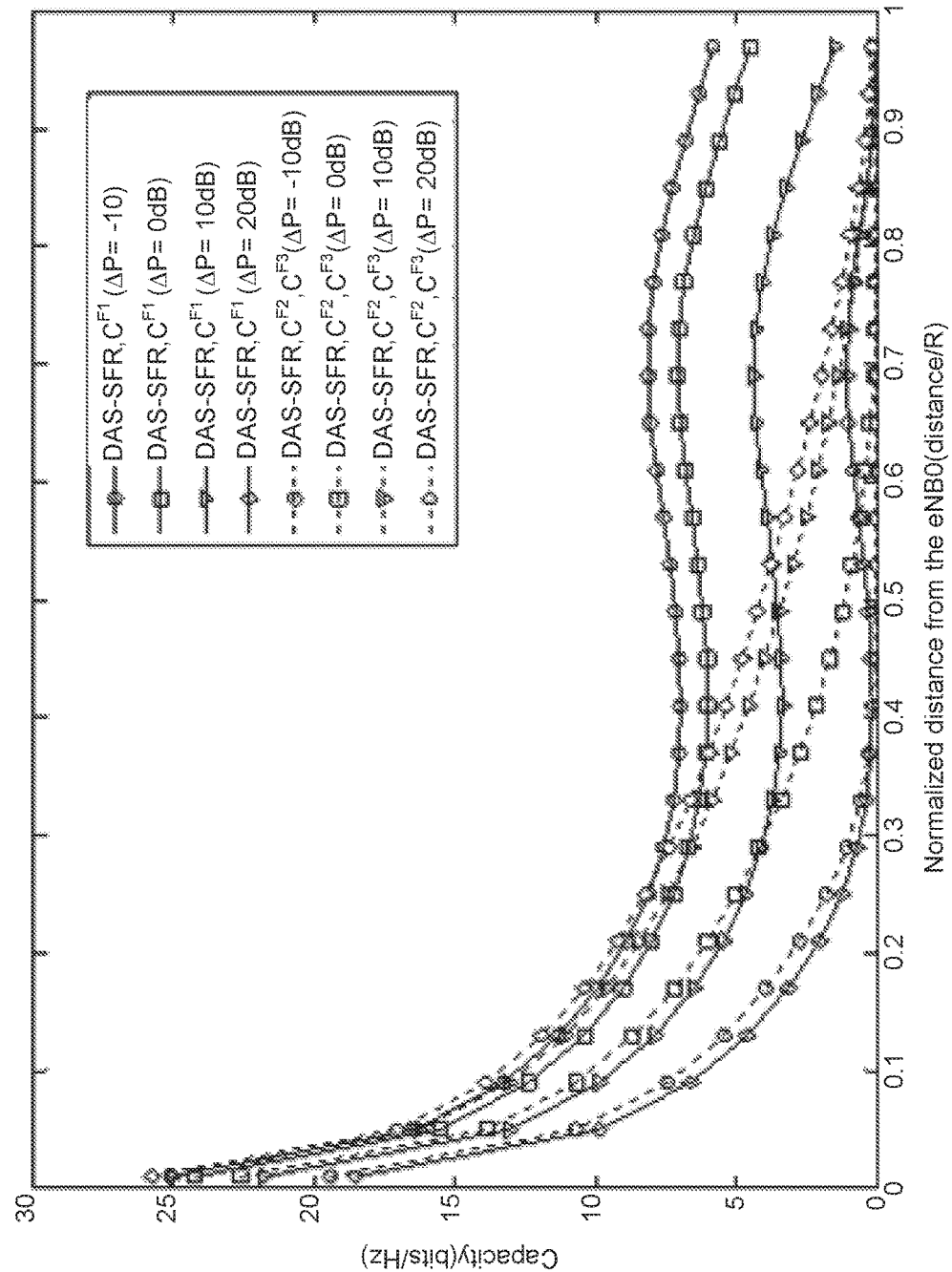
FIGS. 5A-5B illustrate plots of ergodic capacity versus the normalized distance from the DRU0 according to embodiments of the present invention.
Figure 5B:
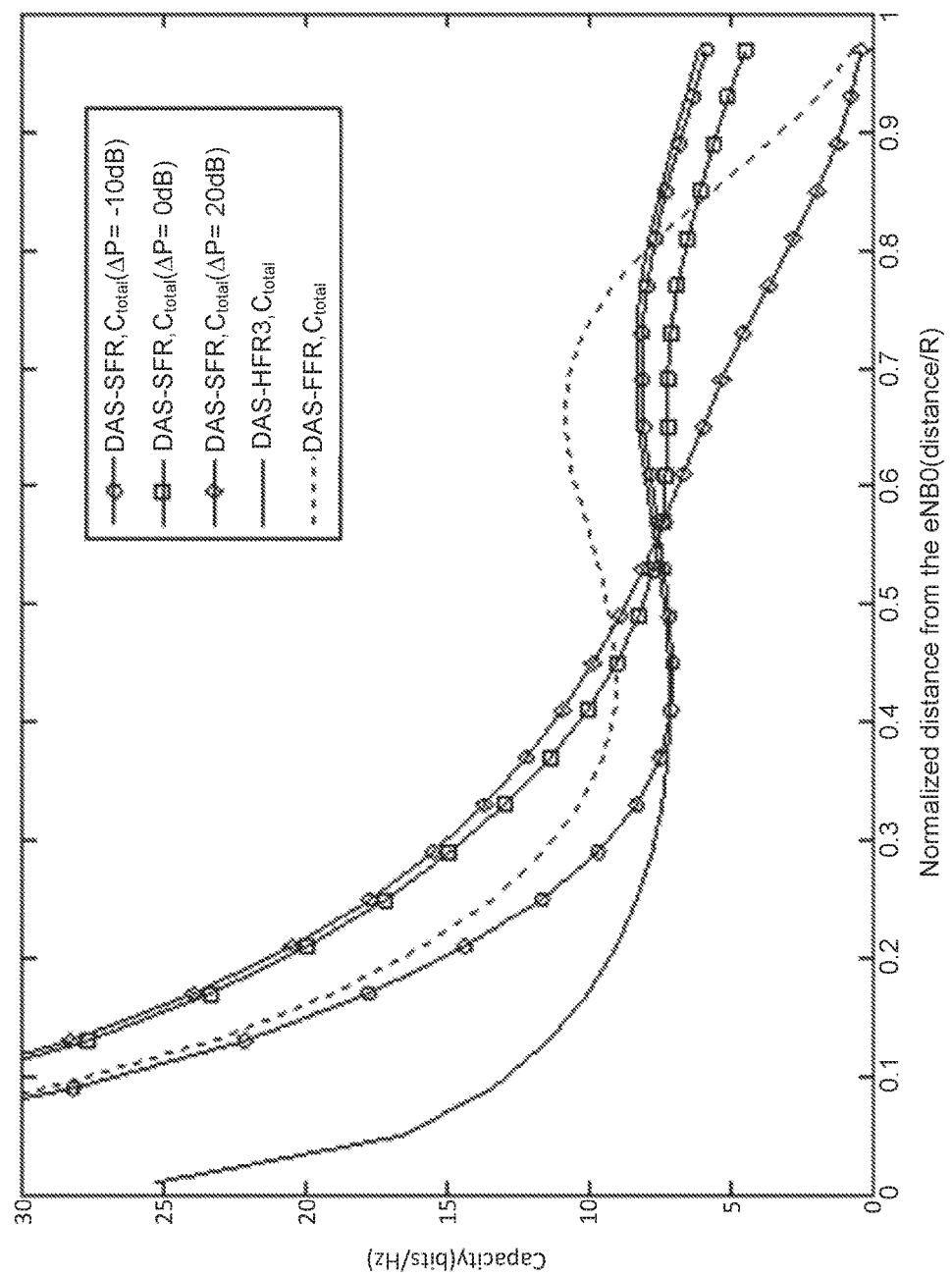

FIGS. 5A-5B represent the ergodic capacity of a cellular DAS's central cell for different frequency reuse techniques versus the normalized distance from the eNB0 DRU0 in the direction of the worst case position X, for a path loss exponent of 3.76. Each scenario is plotted for the individual capacities $C^{(F_1)}$, $C^{(F_2)}$, $C^{(F_3)}$ and also for the total capacity $C_{total}$. These figures show an interesting non-monotonic relationship between capacity and the normalized distance from the base station. This is due to the fact that the signal from a distributed antenna module becomes dominant around 0.6R.

As it can be observed in FIG. 5A, when applying the SFR methods, by increasing ΔP from −10 dB to 20 dB, the central cell's $C^{(F_2)}$ and $C^{(F_3)}$ increase. This, however, increases the interference associated with the edge DAUs of the neighboring cells which are using $F_2$ and $F_3$ as their main frequency band. It is necessary to note that, increasing ΔP from −10 dB to 20 dB, significantly increases the associated interference with the $F_1$ frequency band in the central cell, imposed from the neighboring cells, and thus decreases the central cell's $C^{(F_1)}$.

It is important to notice that, considering SFR methods, as power increases, $C_{total}$ does not change harmonically, which means the ergodic capacity associated with the cell's interior regions increases, and that of the cell's exterior regions decreases. Therefore, the users' distribution within the cell's area plays a significant role when deciding the optimal ΔP.

A secondary consideration when deciding the optimal ΔP is the minimum required capacity ($C_{th}$). As an example, with a high $C_{th}$ (ergodic capacity=20 bit/Hz in FIGS. 5A and 5B), as ΔP increases, a wider radiance in a cell will be covered by ergodic capacity higher than 20. With a low C (ergodic capacity=3 bit/Hz in FIGS. 5A and 5B), as ΔP increases, a shorter radiance in the cells will be covered by ergodic capacity higher than 3.

The FFR method fully uses the frequency bands, therefore, the cell's interior regions' achieved an ergodic capacity higher than ergodic capacity in the cell's interior regions when applying the HFR3 method. For example, at ergodic capacity=20, the FFR method outperforms the HFR3 method, considering the users' satisfaction probability. However, when applying the FFR method, due to the interference caused by the neighboring cells, the edge cells frequently experience dead spots. As an example, considering the users' satisfaction probability, for ergodic capacity=3, the HFR3 method outperforms the FFR method.

FIGS. 6A-D and 7A-7D demonstrate the two $KPI_{SU}$ and $KPI_{CSU}$ for different ΔP, considering four different user distributions. The only parameter that is different in the aforementioned figures is their $C_{th}$, i.e. we consider low $C_{th}$=0.01 $W_{RB}$ and high $C_{th}$=0.07 $W_{RB}$, in FIGS. 6A-6D and FIGS. 7A-7D, respectively. In theoretical analysis, the interior region is distinguished from the exterior region, based on $T_p$. In other words, the region with ergodic capacity higher than $T_p$ is considered as interior region, and the region with ergodic capacity lower than $T_p$ is considered as exterior region. This $T_p$ is associated to the region's ergodic capacity of the frequency bands that are only allocated to the central DRUs. We assume $T_p$=2 (bit/Hz) in our theoretical analyses.

Since both KPI functions are dependent on $G_k$, it is reasonable to consider each of these functions as a criteria to measure the QoS. We analyze two different cases, i.e. ($w_1$=1, $w_2$=0) and ($w_1$=0, $w_2$=1). In the first case, we presume $KPI_{SU}$ as our QoS function whereas in the second case we consider $KPI_{CSU}$ as our QoS function.

Figure 8:
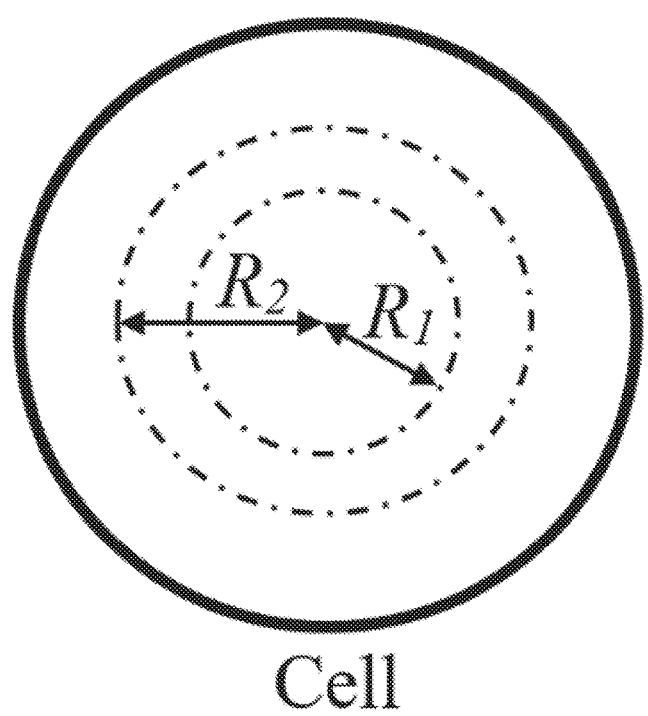
FIG. 8 shows R1 and R2.

We define our user distributions as depicted in Table 1 and FIG. 8 where $$N_{user}^{total} = \sum_i X_i S_i, \, i \in \{\text{region } A, \text{region } B, \text{region } C, \text{region } D\},$$

$S_i$ is the area of region i and $X_i$=(# users of region i)/$S_i$. We perform Monte Carlo simulations to corroborate the analytical results. It is assumed that the total number of users ($N_{user}^{total}$) is 200.

Figure 6A:
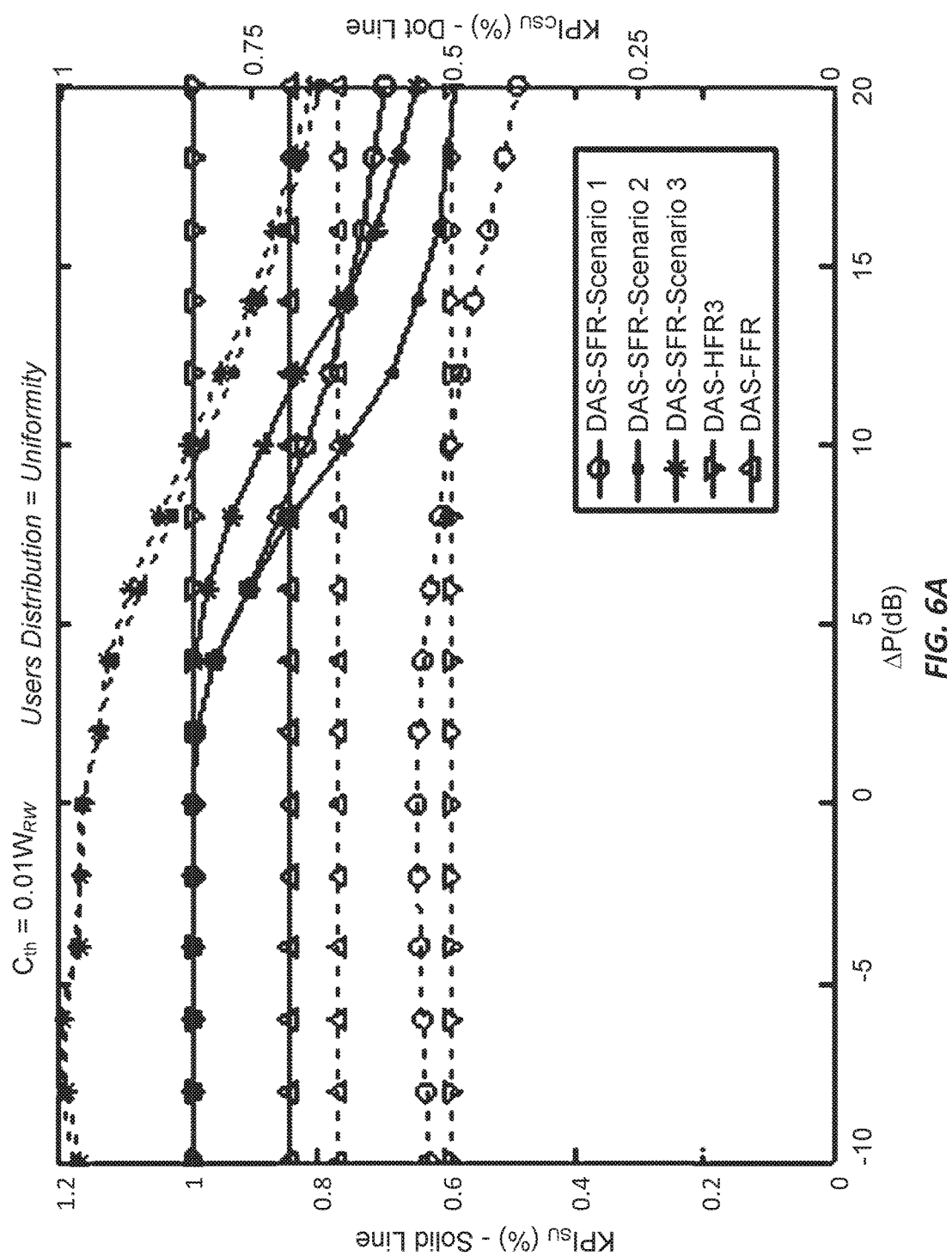
FIGS. 6A-6D illustrate KPIs versus the $\Delta P$ for different distribution users scheme where $C_{th}=0.01 W_{RB}$ according to embodiments of the present invention.
Figure 6B:
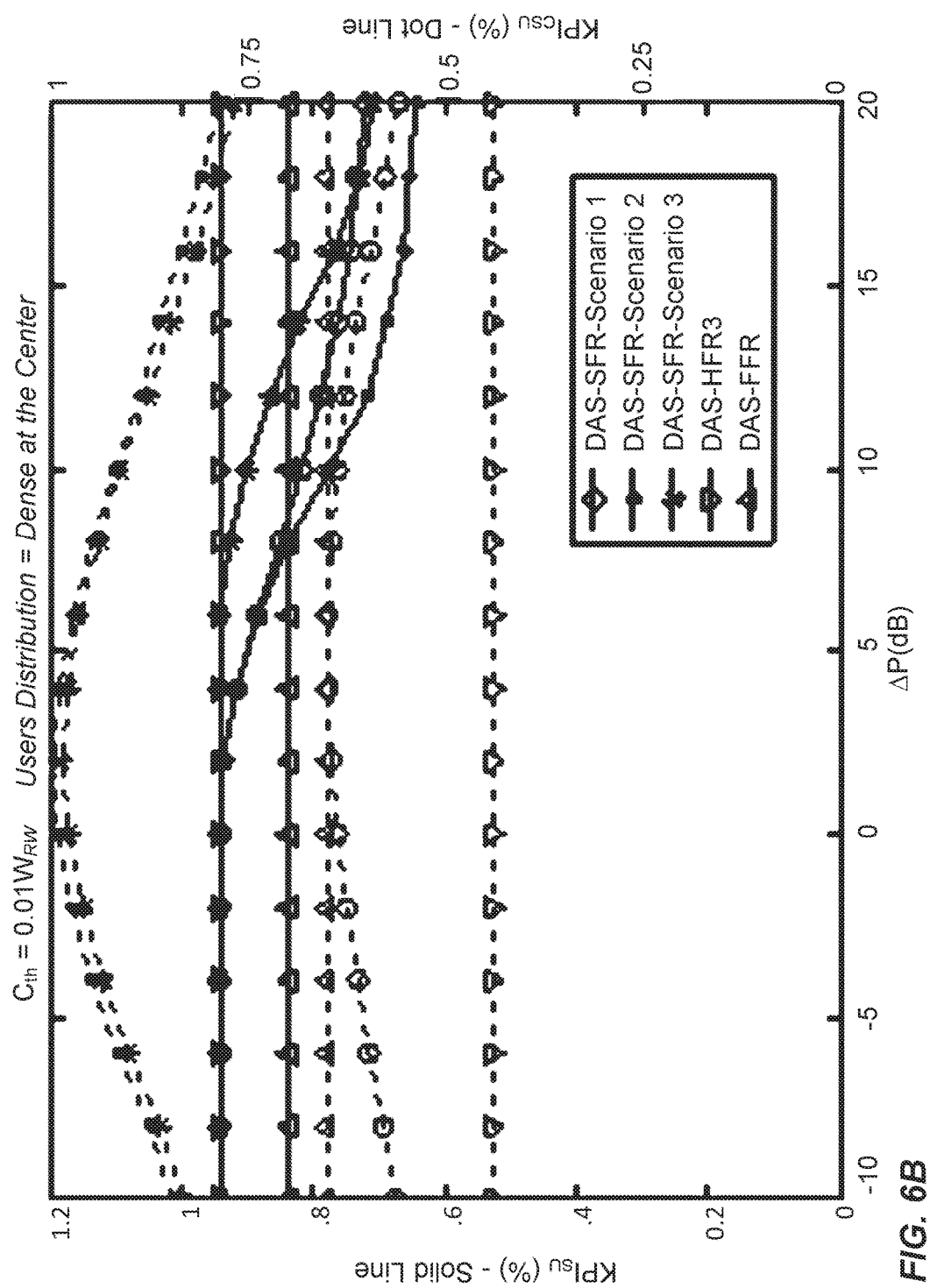
Figure 6C:
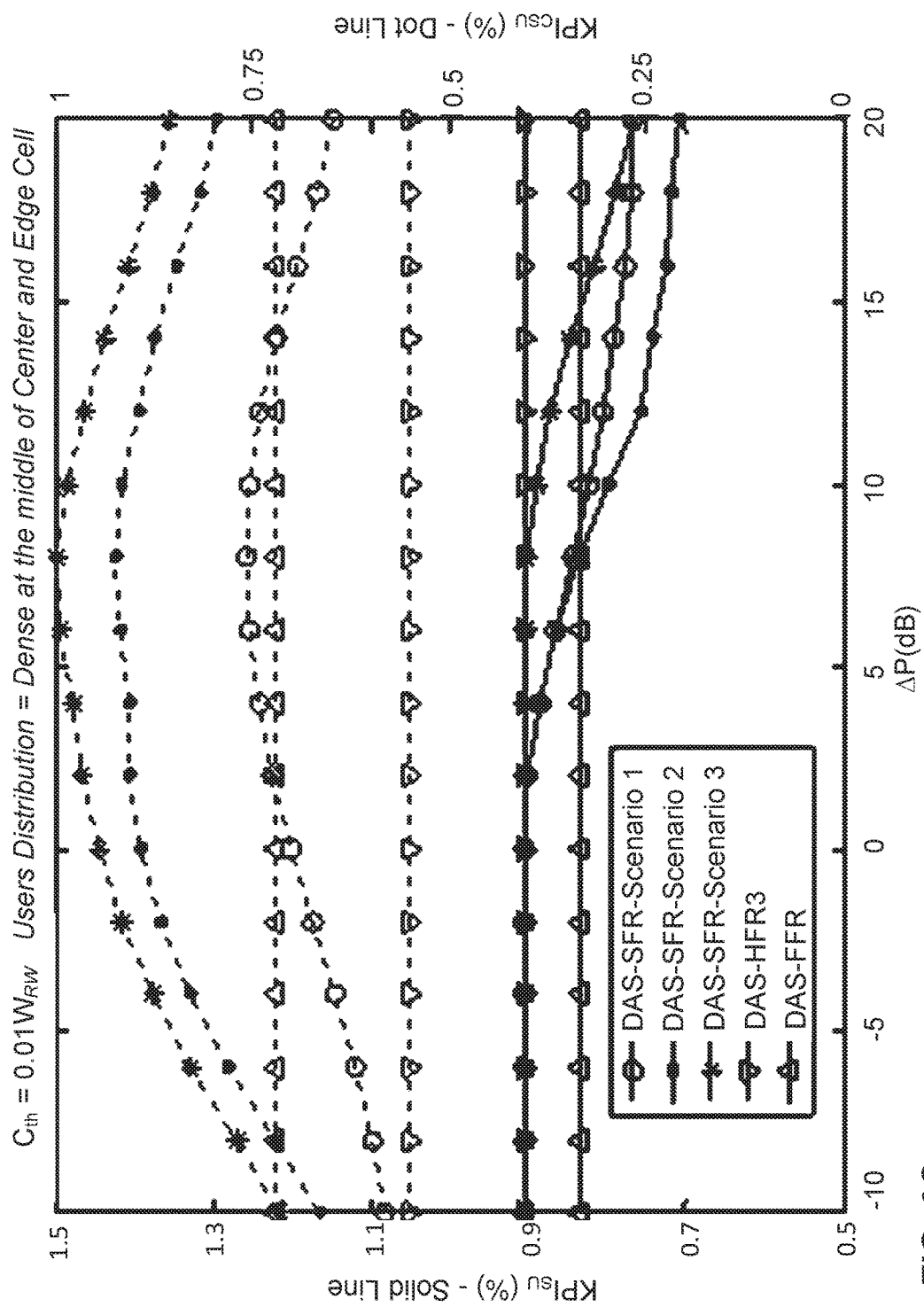
Figure 6D:
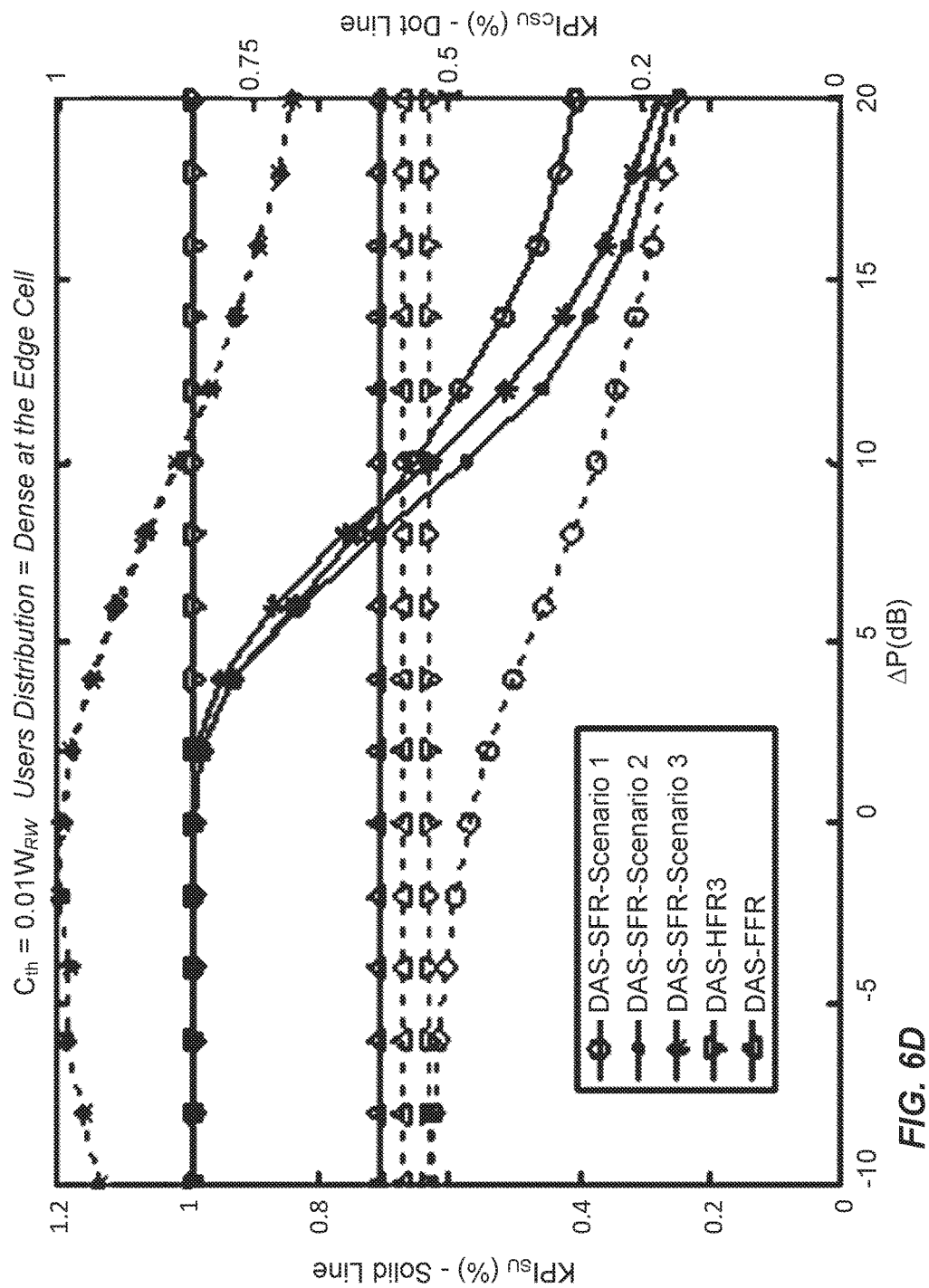

As it is seen in FIGS. 6A-6D, when $C_{th}$ takes a low value, i.e. $C_{th}$=0.01 $W_{RB}$, except for the FFR method, applying the rest of the frequency reuse methods (HFR3, SFR) results in the highest number of the satisfied users ($KPI_{SU}$). Note that, as ΔP increases, when applying DAS-SFR, the number of the satisfied users asymptotically decreases. The above mentioned results hold for all four different user distributions: FIG. 6A: User's Distribution=Uniformity; FIG. 6B: User's Distribution=Dense at the Center; FIG. 6C: User's Distribution=Dense at the middle of Center and Edge Cell; and FIG. 6D: User's Distribution=Dense at the Edge Cell.

As was shown in FIGS. 6A-6D, there exists an optimal ΔP at which the $KPI_{CSU}$ is maximum, for all four different distributions. For instance, when applying the DAS-SFR-Scenario3 method, for the UD, DCD, DCED and DED, the maximum $KPI_{CSU}$ happens at ΔP=−5 dB, 2 dB, 8 dB, and −4 dB, respectively.

One has to consider, the optimal ΔP is different for dissimilar distribution scenarios. Moreover, the DAS-SFR-Scenario3 method outperforms the other two DAS-SFR methods, for all the distributions under consideration.

FIGS. 7A-7D reveal that, when $C_{th}$ takes a large value, i.e. $C_{th}$=0.07$W_{RB}$, the FFR method outperforms the HFR3 method, considering the number of the satisfied users ($KPI_{SU}$). This corroborates our analytical results from FIGS. 5A-5B, as it was explained previously. However, the DAS-SFR-Scenario2 method outperforms all the other methods, at different optimal ΔP values for dissimilar distribution scenarios.

Figure 7A:
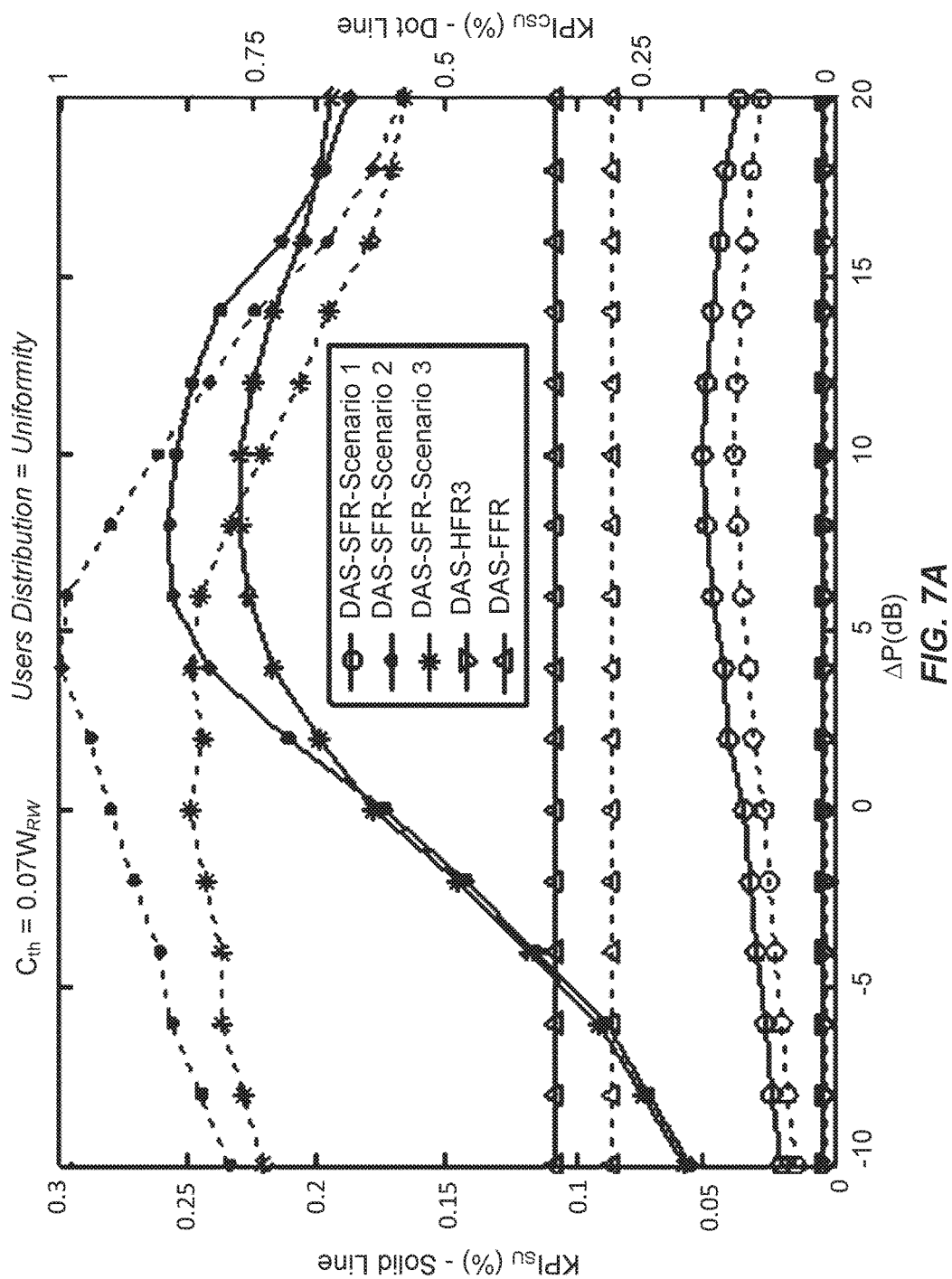
FIGS. 7A-7D illustrate KPIs versus the $\Delta P$ for different distribution users scheme where $C_{th}=0.07 W_{RB}$ according to embodiments of the present invention.
Figure 7B:
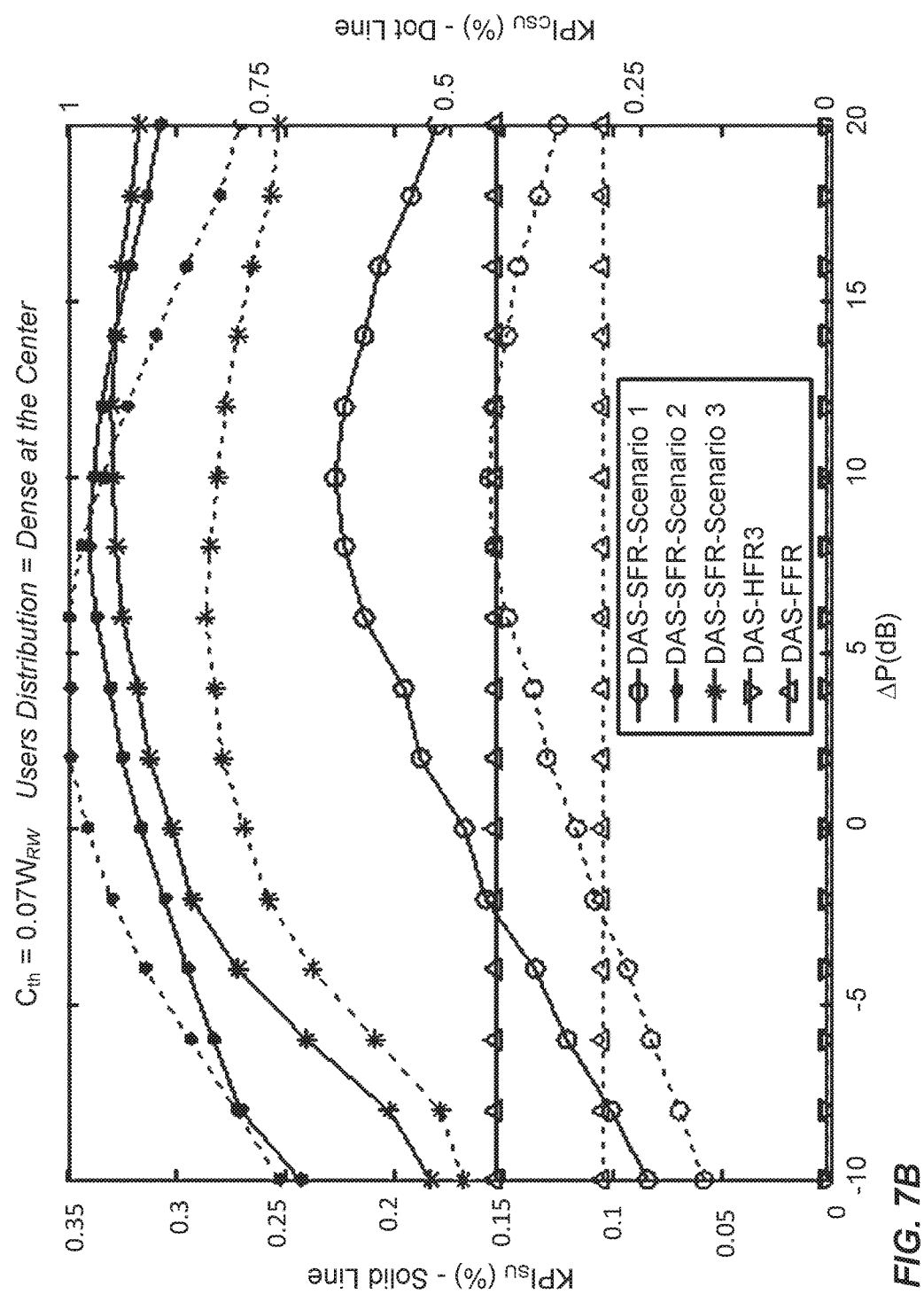
Figure 7C:
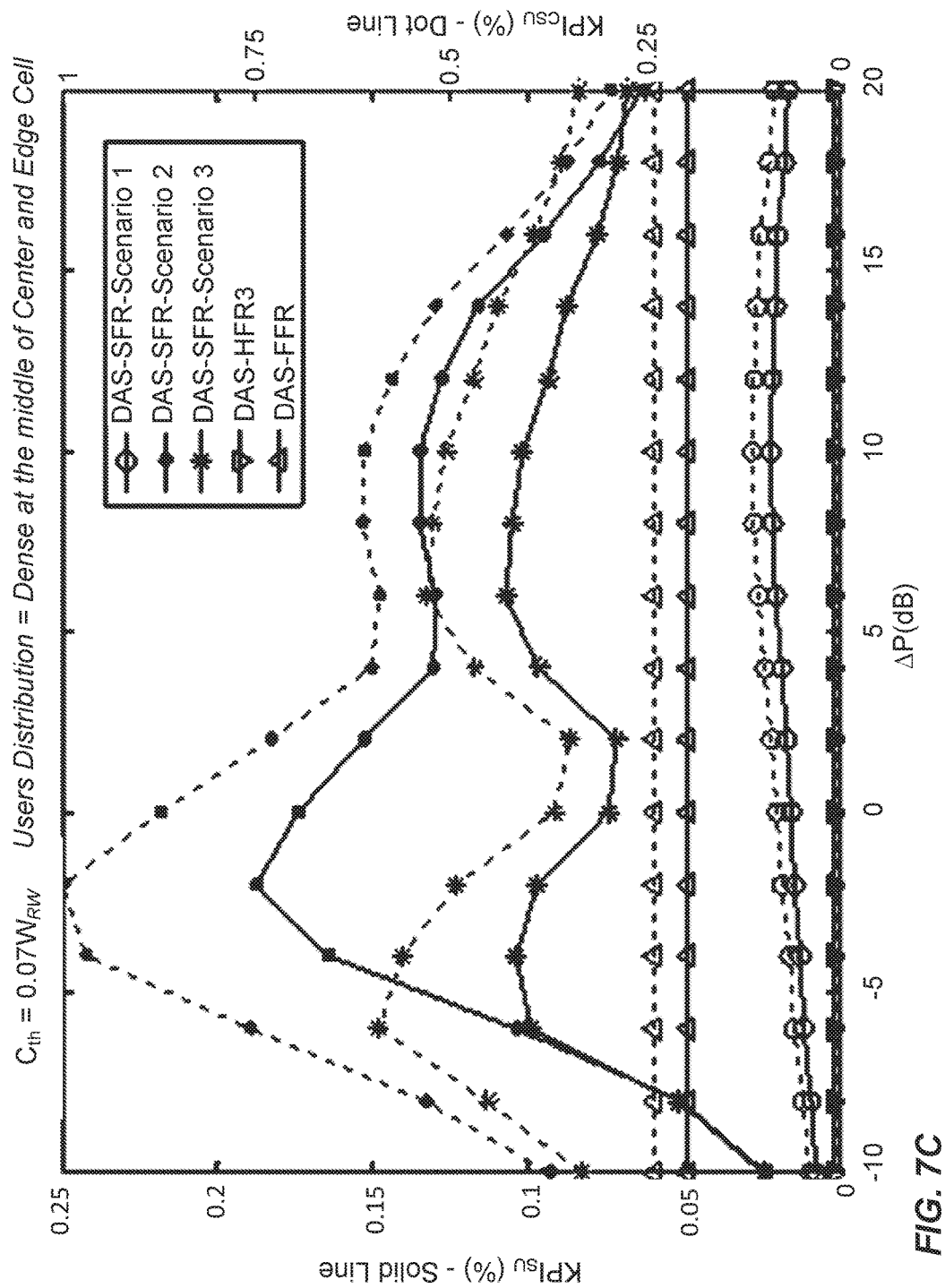
Figure 7D:
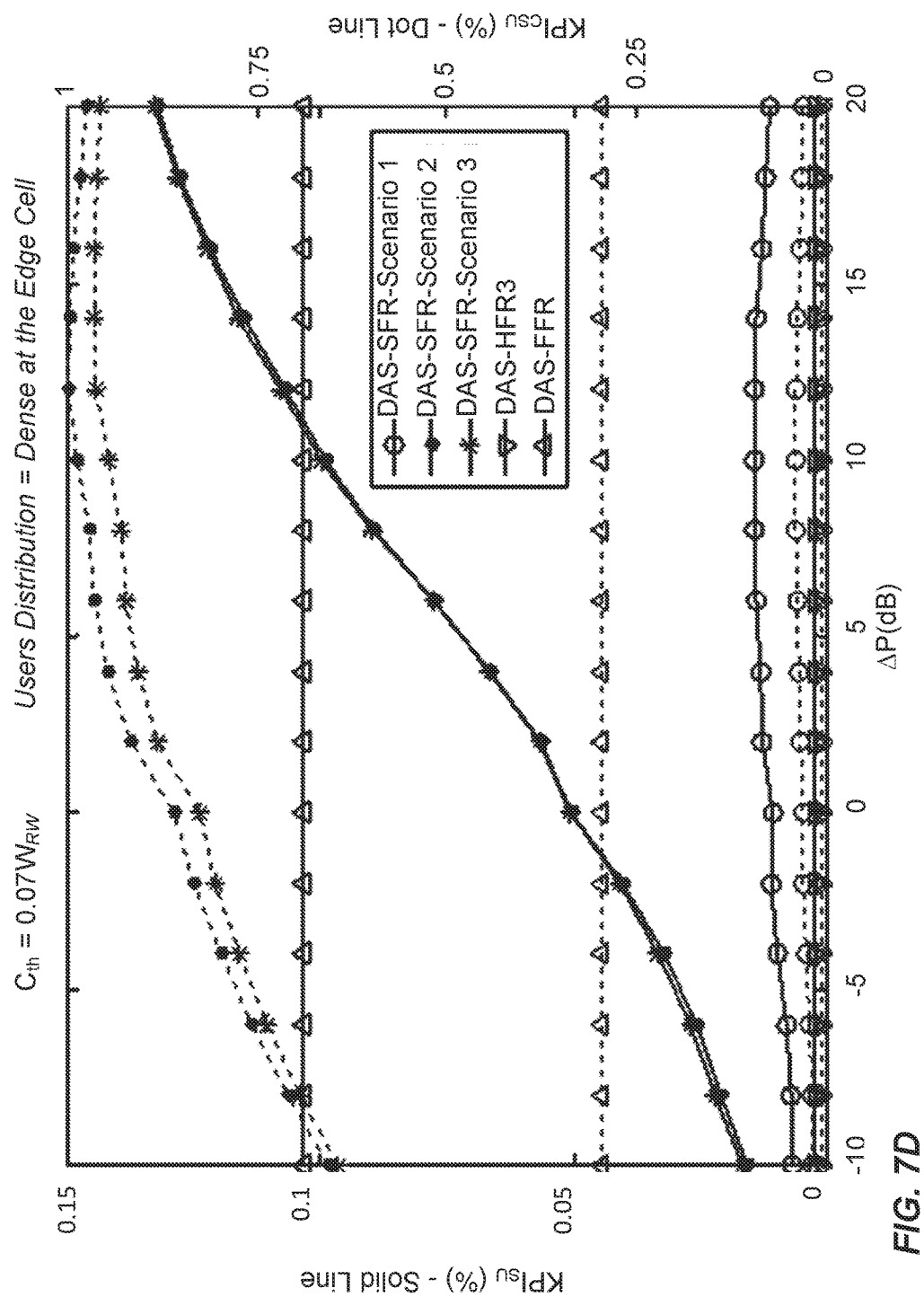

As it can be perceived from FIGS. 7A-7D, there exists an optimal ΔP at which the $K_{PISU}$ and $KPI_{CSU}$ are maximum, for all four different distributions: FIG. 7A: User's Distribution=Uniformity; FIG. 7B: User's Distribution=Dense at the Center; FIG. 7C: User's Distribution=Dense at the middle of Center and Edge Cell; and FIG. 7D: User's Distribution=Dense at the Edge Cell. As an example, when applying the DAS-SFR-Scenario2 method, for the UD, DCD, DCED and DED, the maximum $KPI_{SU}$ and $KPI_{CSU}$ happen at ΔP=6 dB, 4 dB, −2 dB, and 13 dB, respectively.

Note that, the optimal ΔP is different for different distribution scenarios. Moreover, the DAS-SFR-Scenario2 method outperforms the other two SFR methods, for all distributions under consideration. Since the DAS-SFR-Scenario2 uses all the frequency bands in the interior cell region, along with the fact that the users with throughput above the $C_{th}$ are mainly located in the interior cell region, leads to the final conclusion that DAS-SFR-Scenario2 outperforms the other methods.

The capacity of the above mentioned architectures is also investigated through system level simulations. We consider the two-ring hexagonal cellular system with nineteen eNBs, such that each cell has 7 DRUs, as depicted in FIG. 2, where the eNBs distance is 500 meters. The 200 UEs are distributed for 4 user distribution methods which are defined in Table 1. An eNB allocates the available RBs to UEs by estimating the signaling and uplink power of UEs. We use the simulation parameters listed in Table 2.

At a TTI (Transmission Time Interval) for the simulation, the eNB in a cell gathers the CQI (Channel Quality Indicator) information of UEs and allocates the RBs to each UE, using the Round Robin scheduling technique. The throughput of a UE is obtained based on the SINR of the UE in the assigned RB. In system level simulation, SINR is determined by the path loss and lognormal fading measured in RB. The throughput of a $UE_m$ is estimated using the Shannon capacity as follows $$C_m^{(f)} = W_{RB}^{(f)} \log(1 + SINR_m^{(f)}), f = F_1, F_2, F_3 \quad (21)$$

where, $W_{RB}^{(f)}$ is the bandwidth of RBs assigned to a UE and $SINR_m^{(f)}$ is the SINR of a $UE_m$. The cell capacity in each region is the total throughput of UEs in the corresponding region and is expressed as follows $$C_{total} = \sum_{i=1}^{3} \sum_{m=1}^{M} C_m^{(F_i)} \quad (22)$$

Where M is the number of UEs in a group.

The presented numerical results corroborate the analytical results depicted in FIG. 6 and FIG. 7.

Embodiments of the present invention provide a new cell architecture combining two inter-cell interference mitigation techniques, Distributed Antenna System and Soft Frequency Reuse, to improve cell edge user's throughput when the system has full spectral efficiency. A power self-optimization algorithm that aims at maximizing the number of satisfied users while trying to increase their capacity was also proposed. In more detail, the self-optimization algorithm uses the KPIs computed by the server in the last phase and current phase to adjust the power level for the next phase.

An analytical framework is derived to evaluate the user throughput leading to tractable expressions. A natural extension of this work is to address the cellular uplink. The overall capacity increases by using the SFR technique, since the spectral efficiency in the interior region is higher than that in the exterior region when compared to HFR3 technique. The cell edge user's throughput increases by using the SFR technique; since the interference signal from neighbor cells is lower than that the time we use FFR technique.

Analytical and simulation results demonstrated the advantage of using the self-optimization algorithm instead of setting a fixed power level. When a DAS-SFR without the PSO algorithm is considered, the transmission power is set at the beginning of the communication and remains the same during its entire network lifetime. This characteristic can be negative considering a DAS-SFR in a real environment where the inherent user distribution is not constant.

Due to the fact that the inherent environment user distribution is completely variable, the PSO algorithm always guarantees the maximum number of satisfied users during the communication, while the algorithm serves to maximize their capacity as well.

TABLE 1

| | $X_i/n$, $i \in \{A,B,C,D\}$ | | | | | |
|---|---|---|---|---|---|---|
| | $R_1$ | $R_2$ | UD[1] | DCD[2] | DCED[3] | DED[4] |
| Region A | 0 | 0.25 | 1 | 7 | 1 | 1 |
| Region B | 0.25 | 0.50 | 1 | 1 | 7 | 1 |
| Region C | 0.50 | 0.75 | 1 | 1 | 1 | 1 |
| Region D | 0.75 | 1 | 1 | 1 | 1 | 7 |

[1]UD: Uniform Distribution
[2]DCD: Dense at the Center Distribution
[3]DCED: Dense at the mid. of Cent. And Edge cell Distribution
[4]DED: Dense at the Edge cell Distribution

TABLE 2

| Simulation Parameters | |
|---|---|
| PARAMETERS | VALUE |
| Channel Bandwidth for each Frequency Part | 5 MHz |
| Carrier Frequency | 2.14 GHz |
| FFT size | 1024 |
| Number of Resource Blocks for each Frequency Part | 25 |
| Subcarrier Spacing | 15 kHz |
| Cellular Layout | Hexagonal grid, 19 sites |
| Inter-eNB Distance | 500 meters |
| Log-normal Shadowing | 8 dB |
| Propagation loss | 128.1 + 37.6 $\log_{10}$(R(km)) |
| White Noise Power Density | −174 dBm/Hz |
| Scheduling | Round Robin |
| TTI | 1 ms |
| $T_p$ (CQI) | 2 CQI |

What is claimed is:

1. A method of determining a transmission power of a digital remote unit (DRU) in a distributed antenna system (DAS), the method comprising:
    a) setting a transmission power level for the DRU;
    b) determining a key performance indicator related to a number of satisfied users at the transmission power;
    c) iteratively adjusting a transmission power level for the DRU to increase the key performance indicator related to the number of satisfied users; and
    d) setting the transmission power level for the DRU at an iterated power level.

2. The method of claim 1 wherein the transmission power comprises a differential between a reference carrier and one or more carriers.

3. The method of claim 2 wherein the reference carrier comprises a first frequency carrier, and the one or more carriers comprise a second frequency carrier and a third frequency carrier.

4. The method of claim 2 wherein the reference carrier is utilized by multiple antennas of the DRU and the one or more carriers are utilized by a single antenna of the DRU.

5. The method of claim 4 wherein the single antenna is a center antenna of the DRU.

6. The method of claim 5 wherein a set of multiple antennas are edge antennas of the DRU.

7. The method of claim 6 wherein the set of multiple antennas comprise six antennas.

8. The method of claim 1 further comprising:
    a) determining a second key performance indicator related to a capacity for the number of satisfied users;
    b) iteratively adjusting the transmission power level for the DRU to increase the second key performance indicator related to the capacity for the number of satisfied users; and
    c) setting the transmission power level for the DRU at the iterated power level.

9. The method of claim 8 wherein the second key performance indicator related to the capacity for the number of satisfied users is a number of users having a capacity above a predetermined threshold capacity.

10. The method of claim 9 wherein the predetermined threshold capacity is defined by a predetermined threshold bit rate.

11. The method of claim 1 further comprising determining that the transmission power is outside a predetermined range; and
    terminating the method.

12. The method of claim 1 further comprising:
determining that an oscillation indicator is equal to a predetermined value; and
terminating the method.

13. A distributed antenna system comprising:
a digital access unit (DAU) communicatively coupled to a signal source, wherein the DAU is operable to receive wireless resources associated with one or more signal source sectors;
a central DRU coupled to the DAU and assigned to a specific sector of the one or more signal source sectors; and
one or more DRUs communicatively coupled to the central DRU and assigned to the specific sector, and
wherein, the central DRU is assigned a full-reused frequency associated with the specific sector, and wherein each of the one or more DRUs are assigned a particular frequency partition of the full-reused frequency.

14. The distributed antenna system of claim 13 wherein the signal source is assigned the full frequency spectrum and connected to a public switched telephone network or a mobile switching center.

15. The distributed antenna system of claim 13 wherein the specific sector is assigned a plurality of frequency partitions of the full-reused frequency; and
a central antenna is assigned the plurality of frequency partitions.

16. The distributed antenna system of claim 13 wherein the one or more DRUs comprises at least six first-tier DRUs surrounding the central DRU and 12 second-tier DRUs surrounding the first tier DRUs.

17. The distributed antenna system of claim 13 wherein the central DRU and the one or more DRUs are adjacent to a second central DRU and a plurality of DRUs.

18. The distributed antenna system of claim 13 wherein the full-reused frequency comprises 3 frequency partitions.

19. The distributed antenna system of claim 13 wherein the central DRU and the one or more DRUs have multi-drop bus topology.

20. The distributed antenna system of claim 13 coupled by at least one of Ethernet cable, Optical Fiber, Microwave Line of Sight or Non Line of Sight Link, Wireless Link, or Satellite Link.

* * * * *